US009948108B2

United States Patent
Eren et al.

(10) Patent No.: US 9,948,108 B2
(45) Date of Patent: Apr. 17, 2018

(54) DC-BUS CONTROLLER FOR AN INVERTER

(71) Applicant: Queen's University at Kingston, Kingston (CA)

(72) Inventors: Suzan Eren, Kingston (CA); Majid Pahlevaninezhad, Kingston (CA); Alireza Bakhshai, Kingston (CA); Praveen K. Jain, Kingston (CA)

(73) Assignee: SPARQ Systems Inc., Kingston, ON (CA)

( * ) Notice: Subject to any disclaimer, the term of this patent is extended or adjusted under 35 U.S.C. 154(b) by 0 days.

(21) Appl. No.: 14/868,539

(22) Filed: Sep. 29, 2015

(65) Prior Publication Data

US 2016/0094037 A1 Mar. 31, 2016

Related U.S. Application Data

(60) Provisional application No. 62/057,561, filed on Sep. 30, 2014.

(51) Int. Cl.
*H02J 3/38* (2006.01)
*H02M 1/00* (2006.01)
(Continued)

(52) U.S. Cl.
CPC .............. *H02J 3/383* (2013.01); *H02M 1/12* (2013.01); *H02M 7/53875* (2013.01);
(Continued)

(58) Field of Classification Search
CPC ........ H02M 1/12; H02M 1/14; H02M 7/5387; H02M 7/53871; H02M 7/53873;
(Continued)

(56) References Cited

U.S. PATENT DOCUMENTS 5,493,195 A * 2/1996 Heglund .................. H02P 9/40
318/400.13
5,905,644 A 5/1999 Blasko et al.
(Continued)

OTHER PUBLICATIONS

Chung, I-Y., et. al., "Control Methods of Inverter-Interfaced Distributed Generators in a Microgrid System", IEEE Transactions on Industry Applications, vol. 46, No. 3, 1073-1083 (2010).
(Continued)

*Primary Examiner* — Timothy J Dole
*Assistant Examiner* — Sisay G Tiku
(74) *Attorney, Agent, or Firm* — Stephen J. Scribner

(57) ABSTRACT

Provided are DC-bus voltage or DC-bus current controller methods and circuits, for a voltage or current source inverter. A mean value calculator provides an output signal comprising the mean value of the DC-bus voltage or current, which is used as a feedback signal in a closed loop of the voltage or current source inverter controller, such that a ripple in the DC-bus voltage or current is substantially prevented from entering the closed-loop. In some embodiments a droop controller, which may be adaptive, is used in the closed loop with reverse proportional gain. The adaptive droop controller may provide a constant or variable DC-bus voltage or current. Embodiments regulate the DC-bus voltage or current to an optimized value such that power losses for load and grid conditions are minimized or reduced, and voltage and current ripple is minimized. Embodiments may be used in voltage and current source inverters connected to the utility power distribution grid, in power generation systems, in distributed generation systems, and renewable energy systems.

29 Claims, 24 Drawing Sheets

(51) Int. Cl.
*H02M 7/537* (2006.01)
*H02M 1/12* (2006.01)
*H02M 7/5387* (2007.01)

(52) U.S. Cl.
CPC ............... *H02J 3/386* (2013.01); *H02J 3/387* (2013.01); *H02M 2001/0022* (2013.01); *Y02E 10/563* (2013.01); *Y02E 10/763* (2013.01)

(58) Field of Classification Search
CPC . H02M 2001/0022; H02M 2001/0025; H02M 7/537; H02M 7/797; H02J 3/383; H02J 3/386; H02J 3/387
See application file for complete search history.

(56) References Cited

U.S. PATENT DOCUMENTS

| | | | |
|---|---|---|---|
| 7,336,509 B2 * | 2/2008 | Tallam | H02P 21/16 363/34 |
| 8,085,564 B2 | 12/2011 | Klodowski et al. | |
| 8,279,649 B2 * | 10/2012 | Esram | H02J 3/383 363/132 |
| 9,698,713 B2 * | 7/2017 | Lee | H02P 6/28 |
| 2011/0130889 A1 * | 6/2011 | Khajehoddin | H02J 3/383 700/298 |
| 2011/0238245 A1 * | 9/2011 | Gallegos-Lopez | B60L 11/14 701/22 |
| 2012/0087159 A1 * | 4/2012 | Chapman | H02J 3/383 363/41 |
| 2012/0242273 A1 * | 9/2012 | Hsieh | H02P 1/029 318/806 |
| 2012/0257429 A1 * | 10/2012 | Dong | H02M 3/1582 363/127 |
| 2015/0194909 A1 * | 7/2015 | Pahlevaninezhad | H02M 7/5387 363/132 |
| 2016/0006338 A1 * | 1/2016 | Sakimoto | H02M 1/00 363/131 |
| 2016/0105093 A1 * | 4/2016 | Della Flora | H02J 3/383 363/55 |

OTHER PUBLICATIONS

Karlsson, P., et al., "DC Bus Voltage Control for a Distributed Power System", IEEE Transactions on Power Electronics, vol. 18, No. 6, 1405-1412 (2003).

Liu, F., et al., "Parameter Design of a Two-Cancel-Loop Controller Used in a Grid-Connected Inverter System with LCL Filter", IEEE Transactions on Industrial Electronics, vol. 56, No, 11, 4483-4491 (2009).

Wu, T-F., et al., "DC-Bus Voltage Control for Three-Phrase Bi-directional Inverter in DC Microgrid Applications", IEEE. 377-383 (2012).

* cited by examiner

DC-BUS CONTROLLER FOR AN INVERTER

RELATED APPLICATION

This application claims the benefit of the filing date of Application No. 62/057,561, filed on Sep. 30, 2014, the contents of which are incorporated herein by reference in their entirety.

FIELD

This invention relates to methods, circuits, and devices for power inverters. In particular, this invention relates to controllers for voltage and current source inverters used in applications such as distributed power generation, which utilize voltage or current source inverters to provide AC power for grid connection.

BACKGROUND

In voltage and current source inverters, control of the DC-bus voltage or current is required to control the balance between AC and DC power. In single phase systems control options are limited by ripple in the DC-bus voltage or current that results from ripple or harmonics present on the AC side. For example, in utility grid-connected inverters, such as in distributed generation (DG) systems, the ripple in the DC-bus voltage or current is at twice the grid frequency. The ripple can interact with the DC-bus voltage or current controller, resulting in distortion of the current delivered to the utility grid.

Conventional DC-bus voltage and current control methods are limited in terms of speed of transient recovery. Furthermore, improvements in speed, achieved by increasing the bandwidth of the control method, are not practical due to the presence the ripple across the DC-bus voltage or current. The bandwidth provided by conventional DC-bus voltage control methods is usually limited in order to prevent the double frequency ripple from propagating to the current control loop, which can cause the current delivered to the utility grid to become distorted. Furthermore, many commonly used control methods are proportional-integral (P)-based, which introduces the additional difficulty of integration. Fast integration can lead to saturation and instability, because large DC values are being integrated. This necessitates that all PI-based controllers are designed to provide slow integration, which again limits the speed of the control method with respect to transient recovery. However, PI-based control methods are well-known, easy to design, and provide simplicity, and accordingly they are often used for regulating the DC-bus voltage.

The limitations of prior DC-bus voltage control methods are twofold: (1) speed is limited by the bandwidth, which in turn is limited by the double frequency ripple across the DC-bus voltage, and (2) the simplicity provided by using conventional PI-based controllers comes at the price of further limiting speed due to the slow integrative action of the controller. Fast integration by PI-based controllers causes saturation when dealing with large DC values, so a PI-based control method necessarily provides slow integration. Both limitations affect the speed of the control method. Nonlinear controllers can provide better bandwidth than linear controllers, however they are generally not preferred because they tend to be more complex, and their stability is hard to determine.

SUMMARY

Described herein is a DC-bus voltage or DC-bus current controller for a voltage or current source inverter, comprising: a mean value calculator that provides an output signal comprising the mean value of the DC-bus voltage or current; wherein the mean value of the DC-bus voltage or current is used as a feedback signal in a closed loop of the voltage or current source inverter controller, such that a ripple in the DC-bus voltage or current is substantially prevented from entering the closed-loop.

In one embodiment the mean value calculator calculates the mean value of the DC-bus voltage from the maximum and minimum of the DC-bus voltage. In another embodiment the mean value calculator calculates the mean value of the DC-bus current from the maximum and minimum of the DC-bus current.

Embodiments may include a droop controller; wherein the droop controller operates in the closed loop with reverse proportional gain; and wherein the output signal of the mean value calculator is used as an input of the droop controller.

The droop controller may be an adaptive droop controller; wherein the adaptive droop controller provides a constant DC-bus voltage or current. In another embodiment the droop controller is an adaptive droop controller; wherein the adaptive droop controller provides a variable DC-bus voltage or current; wherein the DC-bus voltage or current is regulated to an optimized value such that power losses for load and grid conditions are minimized or reduced. In one embodiment, power losses across an output filter inductor for varying load and/or grid conditions are minimized or reduced.

Also described herein is a voltage source inverter including a DC-bus voltage controller as described herein, and a current source inverter including or DC-bus current controller as described herein.

Also described herein is a method of controlling DC-bus voltage or current of a voltage or current source inverter, comprising: using a mean value calculator to output a feedback signal comprising a mean value of the DC-bus voltage or current; and using the feedback signal in a closed-loop controller of the voltage or current source inverter, such that a ripple in the DC-bus voltage or current is substantially prevented from entering the closed-loop.

The method may include calculating the mean value of the DC-bus voltage from the maximum and minimum of the DC-bus voltage, or calculating the mean value of the DC-bus current from the maximum and minimum of the DC-bus current.

Embodiments may further comprise operating a droop controller in the closed loop with reverse proportional gain; and using the feedback signal as an input of the droop controller.

The droop controller may be an adaptive droop controller; the method further comprising using the adaptive droop controller to provide a constant DC-bus voltage or current, or using the adaptive droop controller to provide a variable DC-bus voltage or current; and regulating the DC-bus voltage or current to an optimized value such that power losses for load and grid conditions are minimized or reduced. In one embodiment, power losses across an output filter inductor for varying load and/or grid conditions are minimized or reduced.

Embodiments may be configured for use with a power generator in a DG system, such as a renewable energy power conditioning system, which may be connected to a power distribution grid. The power generator may be at least one photovoltaic cell, wind turbine, or fuel cell. In one embodiment the power generator is at least one photovoltaic cell.

BRIEF DESCRIPTION OF THE DRAWINGS

For a greater understanding of the invention, and to show more clearly how it may be carried into effect, embodiments will be described, by way of example, with reference to the accompanying drawings, wherein common reference numerals refer to elements with like or similar functions.

DETAILED DESCRIPTION OF EMBODIMENTS

DC-bus voltage control methods and circuits described herein regulate the voltage across the input of a voltage source inverter (VSI). DC-bus current control methods and circuits described herein regulate the current through the input of a current source inverter (CSI). Embodiments may be used in, for example, renewable energy power conditioning systems, such as distributed generation (DG) power systems (e.g., photovoltaic, wind turbine, full cell), and may be connected to the power distribution grid. Embodiments are described herein primarily with respect to single-phase grid-connected inverters; however, other applications will be readily apparent to those of ordinary skill in the art.

Embodiments may be used in substantially any single-phase application where there is a two-stage power conditioning system. For example, such a system may include a first stage having either an AC-DC rectifier or a DC-DC converter, and the second stage may a VSI or CSI. In systems including a VSI there may be an energy storage capacitor between the two stages. In systems including a CSI there may be an energy storage inductor between the two stages. In VSI embodiments, the DC-bus voltage is the parameter that is regulated; whereas for CSI embodiments the DC-bus current is regulated. That is, in the case of a VSI, it is the DC-bus voltage that carries the double frequency ripple; whereas in the case of a CSI, it is the DC-bus current that carries the double frequency ripple. DC-bus voltage and current control embodiments described herein address two challenges: speed (i.e., transient recovery), and reduction or elimination of the ripple in the voltage across the energy storage capacitor, or in the current through the energy storage inductor. The embodiments provide a fast transient response for a closed-loop system, and ensure optimal operation of the VSI or CSI during steady-state conditions.

Figure 1A:
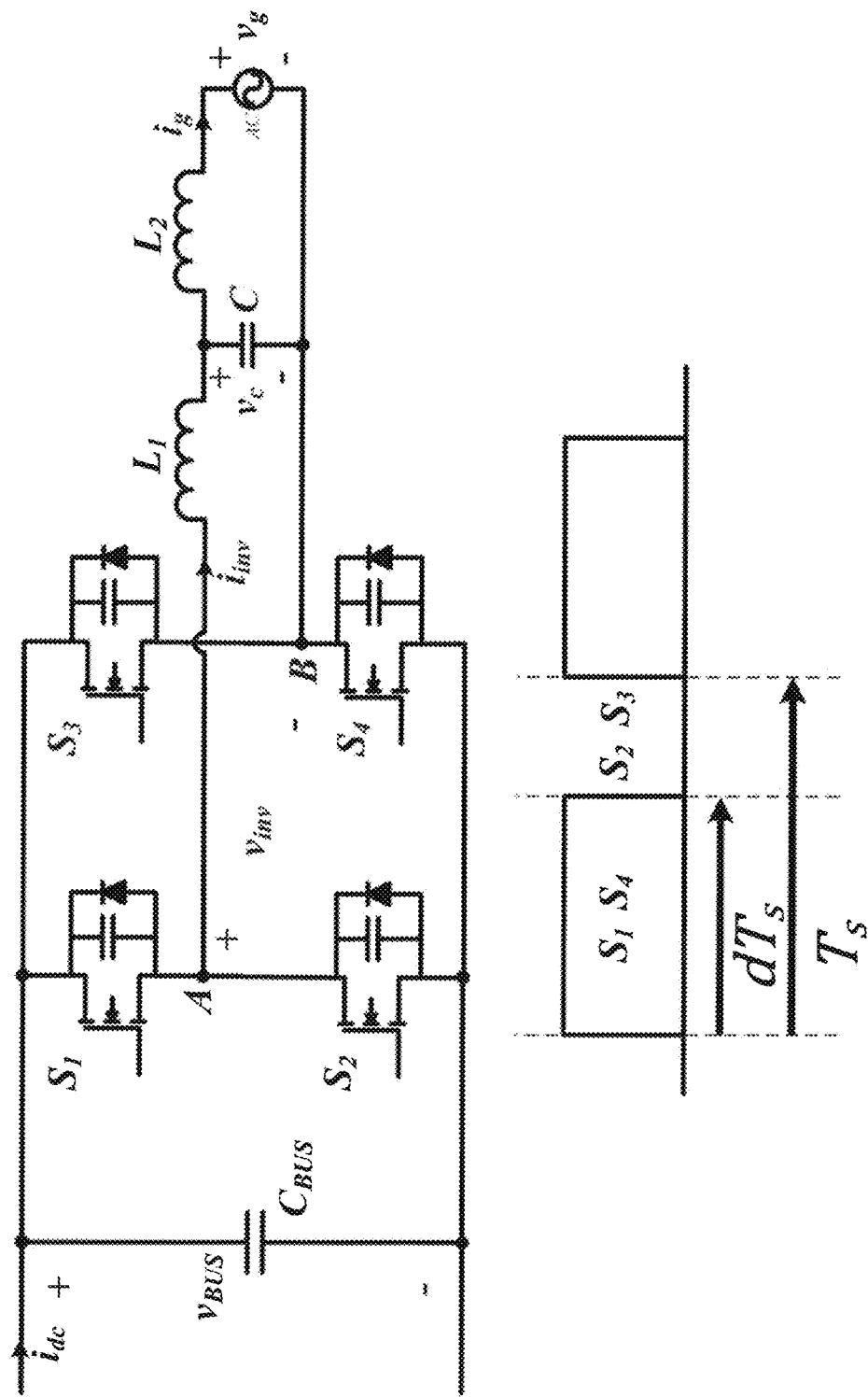
FIGS. 1A and 1B are generalized schematic drawings of systems with which embodiments described herein may be used, based on a voltage source inverter (VSI) and a current source inverter (CSI), respectively.
Figure 1B:
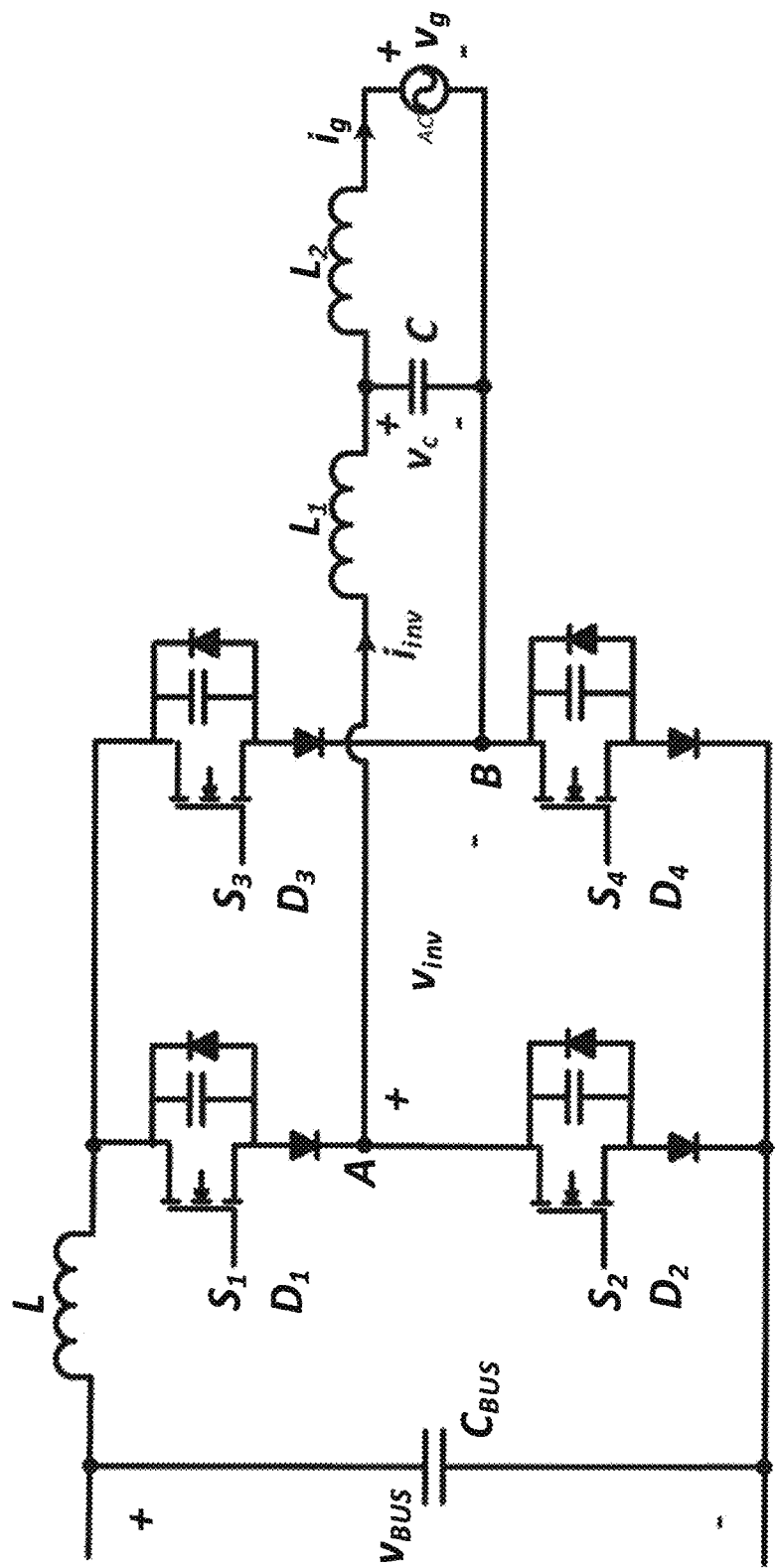
Figure 2:
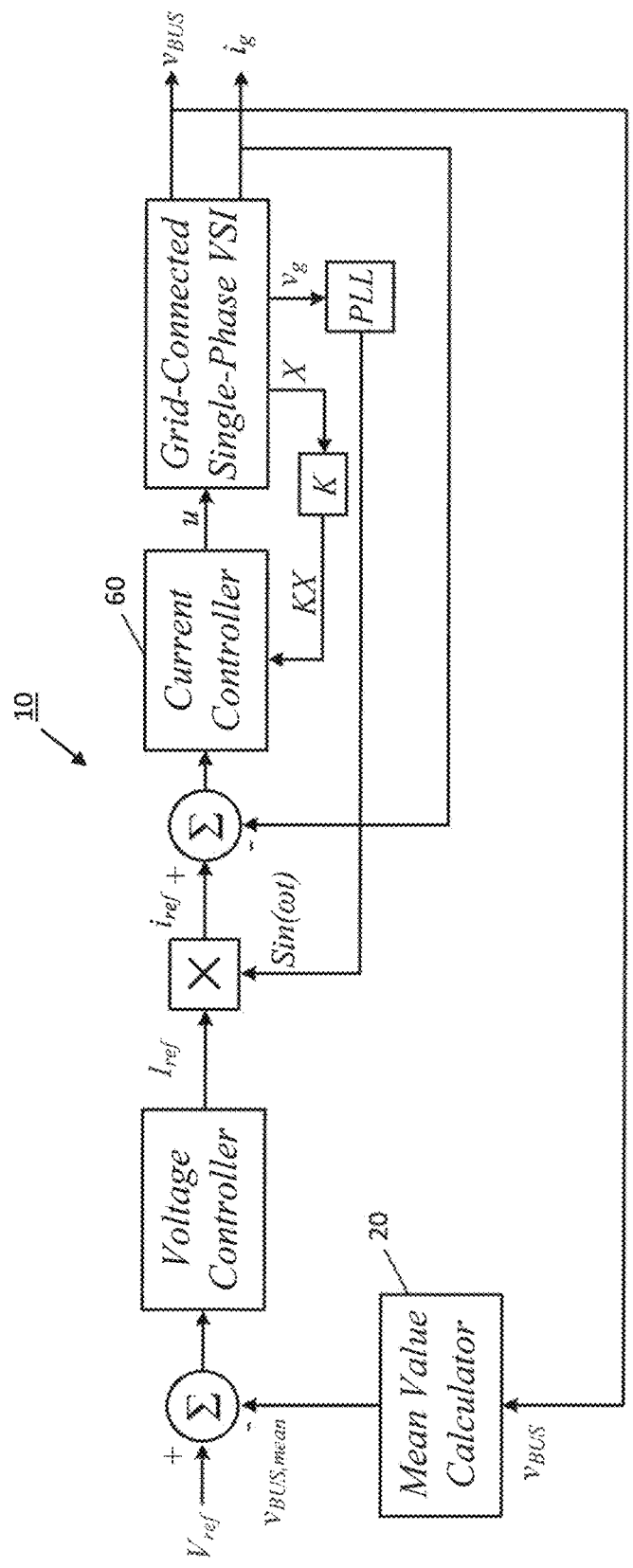
FIG. 2 is a diagram showing where a DC-bus voltage sensing technique employing a mean value calculator may be placed in a closed-loop DC-bus voltage control system, according to one embodiment.

FIGS. 1A and 1B show a generalized VSI and CSI, respectively, to which the embodiments described herein may be applied. FIG. 2 shows a controller 10 based on a closed-loop control system. The controller employs a sensing technique, including a mean value calculator 20, according to one embodiment. Embodiments of the mean value calculator are shown in detail in FIGS. 3A and 3B, for a VSI and a CSI, respectively. One function of the mean value calculator is to substantially reduce or eliminate the voltage or current ripple (e.g., a second harmonic ripple, as may be present in grid-connected inverters); that is, to effectively prevent the ripple from entering the closed-loop control system.

In one embodiment, the mean value calculator calculates the mean value of the DC-bus voltage or current, and feeds this value into the control system, such as the DC-bus voltage or current controller 60, thereby substantially reducing or effectively eliminating the second harmonic ripple from entering the closed-loop control system. The embodiments advantageously avoid the need to reduce the bandwidth in order to inhibit the second harmonic ripple. Consequently, the speed of the DC-bus voltage or current controller is not compromised, and may be substantially increased.

Figure 4A:
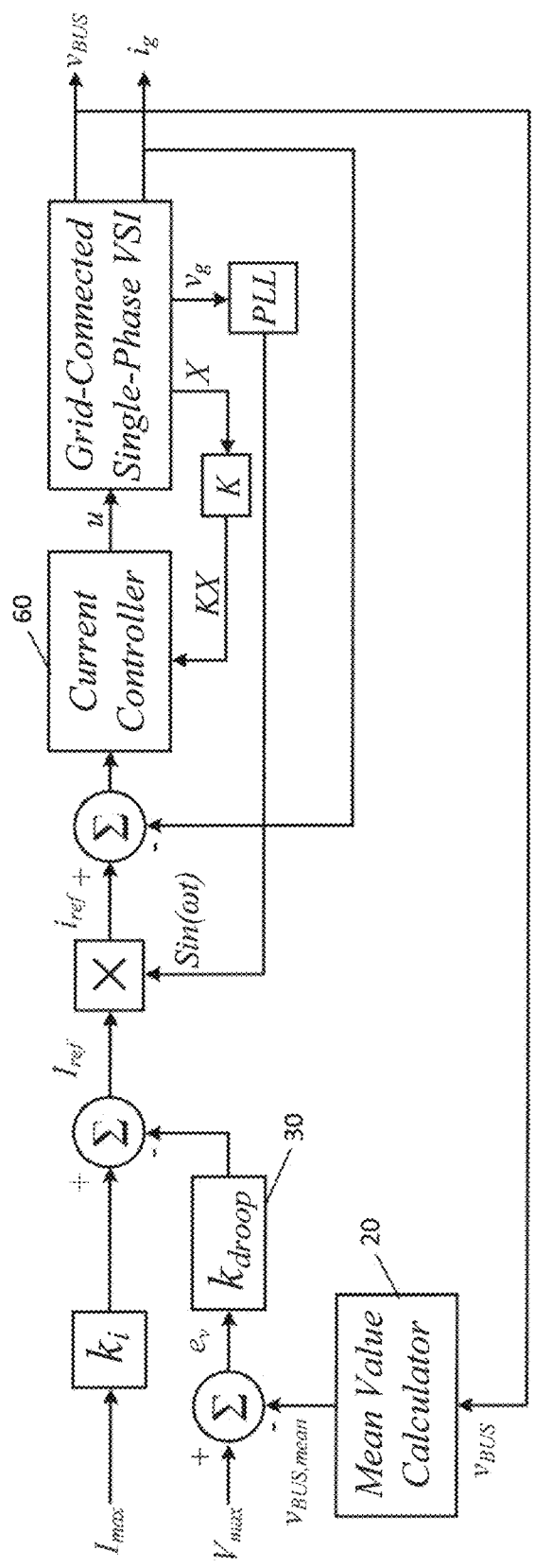
FIG. 4A is a diagram showing a closed-loop DC-bus voltage control system with droop controller, according to one embodiment.
Figure 4B:
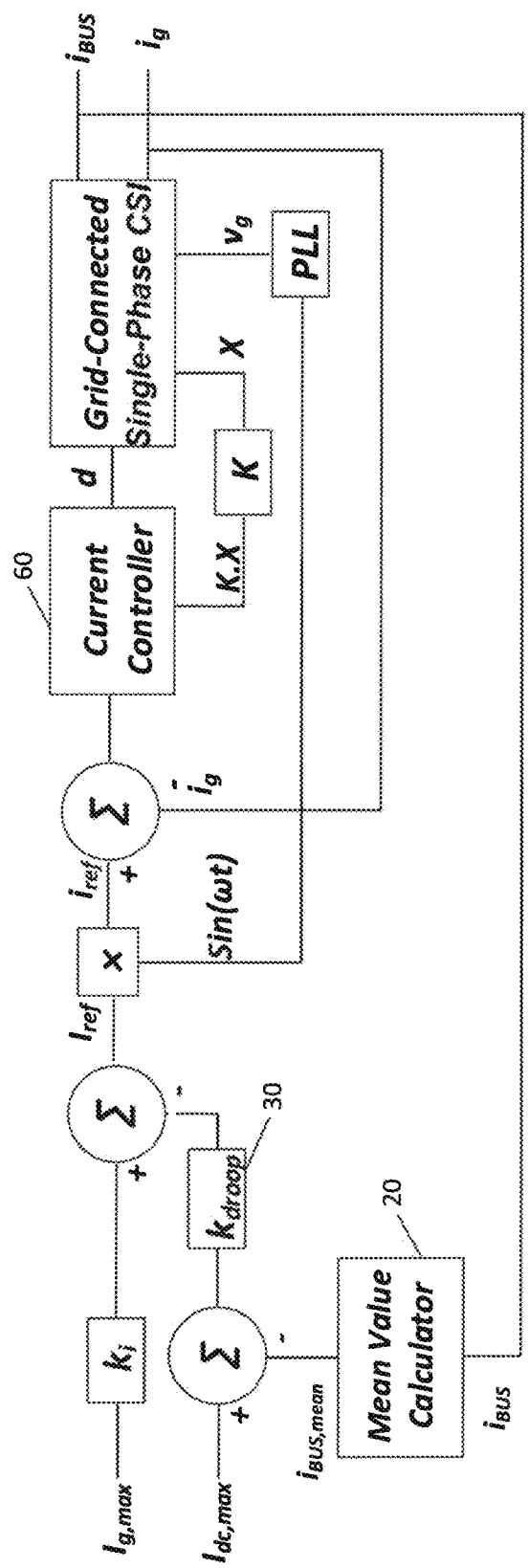
FIG. 4B is a diagram showing a closed-loop DC-bus current control system with droop controller, according to one embodiment.

In FIGS. 4A and 4B, further embodiments of a DC-bus voltage controller and a DC-bus current controller, respectively, are shown. The embodiments include a mean value calculator 20, and a DC-bus droop controller 30, which operates with a fast response time to regulate the DC-bus voltage or current while (1) fixing the DC-bus voltage or current to a constant value, and/or (2) reducing overall power losses of the system.

In VSI embodiments, regulating the DC-bus voltage across the energy storage capacitor allows the power to flow from the input-side converter to the VSI, as the capacitor does not store energy when its voltage is held constant. In the case of CSI embodiments, the same holds true for the energy storage inductor. By regulating the DC-bus current, it is ensured that the power may flow from the input-side converter to the CSI, as the inductor does not store energy when its current is held constant.

Figure 5A:
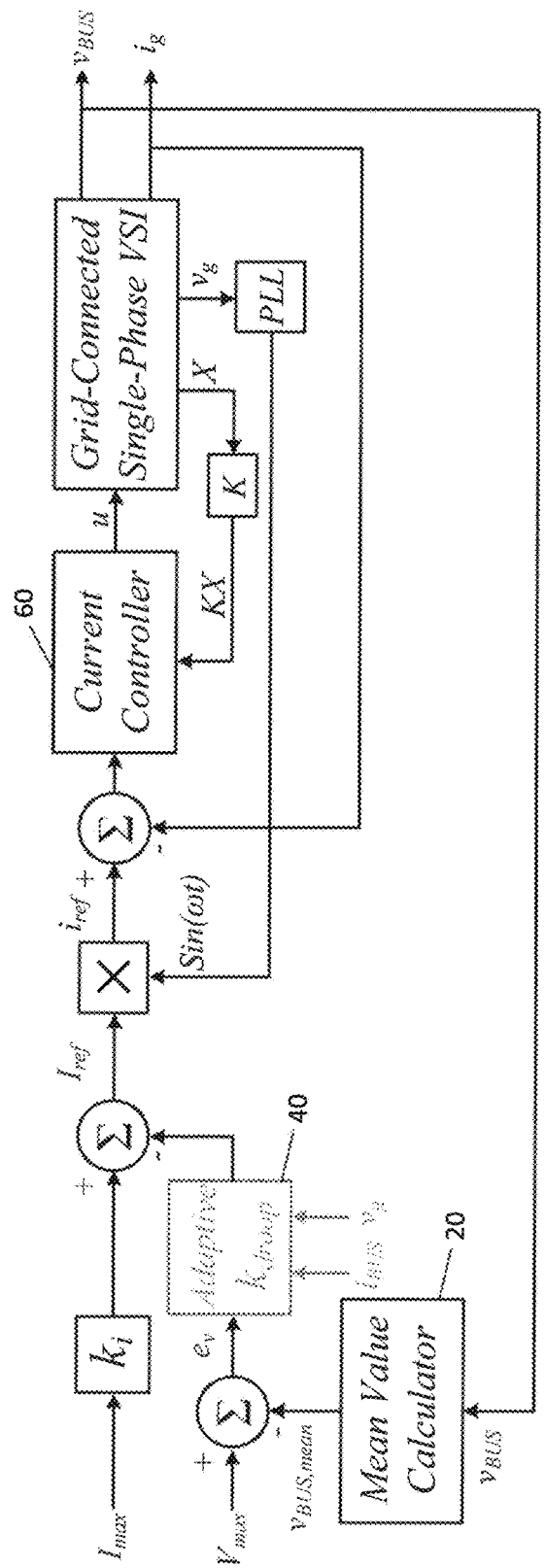
FIG. 5A is a diagram showing a closed-loop DC-bus voltage control system with adaptive droop controller, according to one embodiment.

In some embodiments, such as the embodiment of FIG. 5A, an adaptive droop controller 40 is employed. This technique provides a fast transient response for a closed-loop system, and ensures optimal operation of the VSI or CSI during steady-state conditions. In some applications, like hybrid renewable energy systems, a constant DC-bus voltage or current may be preferred; whereas in other applications, a variable DC-bus voltage or current that adaptively changes to optimize efficiency by reducing power losses may be preferred. The adaptive droop controller may be configured to produce either: (a) a constant DC-bus voltage or current, regulated to a value determined by the requirements of a particular application, or (b) a variable DC-bus voltage or current, which is regulated to an optimized value that reduces power losses for load and grid conditions. An adaptive droop controller, such as embodiments described herein, is also very fast compared to a conventional PI controller because it does not use any integration.

Embodiments may be implemented in whole or in part using discrete components, using digital technology (e.g., in a digital signal processor (DSP), field programmable gate array (FPGA), or application specific integrated circuit (ASIC) device), or using a combination thereof. For example, one or more components may be implemented in an algorithm using a suitable hardware language such as, for example, very high speed integrated circuit (VHSIC) hardware descriptive language (VHDL), register transfer language Km), or Verilog. Such an algorithm may be implemented in, for example, a FPGA or ASIC device.

Embodiments will be further described by way of the following non-limiting examples.

EXAMPLE 1

Application to Voltage Source Inverter

As noted above, DC-bus voltage and current control embodiments described herein may be used in substantially any single-phase application. Such an application is a grid-connected renewable energy power conditioning system, which usually includes a two-stage power conditioning system comprised of a first-stage AC-DC rectifier or a DC-DC converter, a second-stage grid-connected VSI or CSI, and an energy storage element between the two stages. This example employs a VSI in such an application, as may be implemented for a grid-connected photovoltaic (PV) panel. However, a CSI could also be employed.

The embodiment of FIG. 2 shows a mean value calculator 20 inserted into a closed-loop control system 10 of a VSI. The output of the mean value calculator, the mean value of the DC-bus voltage, $v_{BUS,mean}$, is used as a feedback signal instead of the DC-bus voltage itself, $v_{BUS}$. This effectively removes the second harmonic ripple from entering the closed-loop control system, as the mean value is substantially the DC component of the DC-bus voltage. This allows the DC-bus voltage controller to have a much higher bandwidth than a controller using the DC-bus voltage as the feedback signal.

Figure 3A:
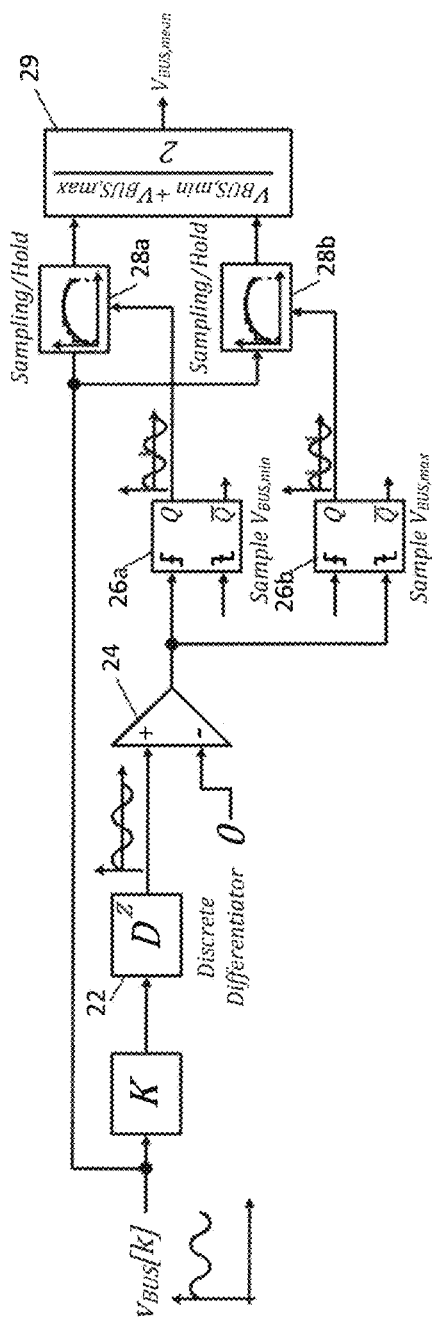
FIG. 3A is a diagram of a mean value calculator, according to an embodiment for use with a VSI.
Figure 3B:
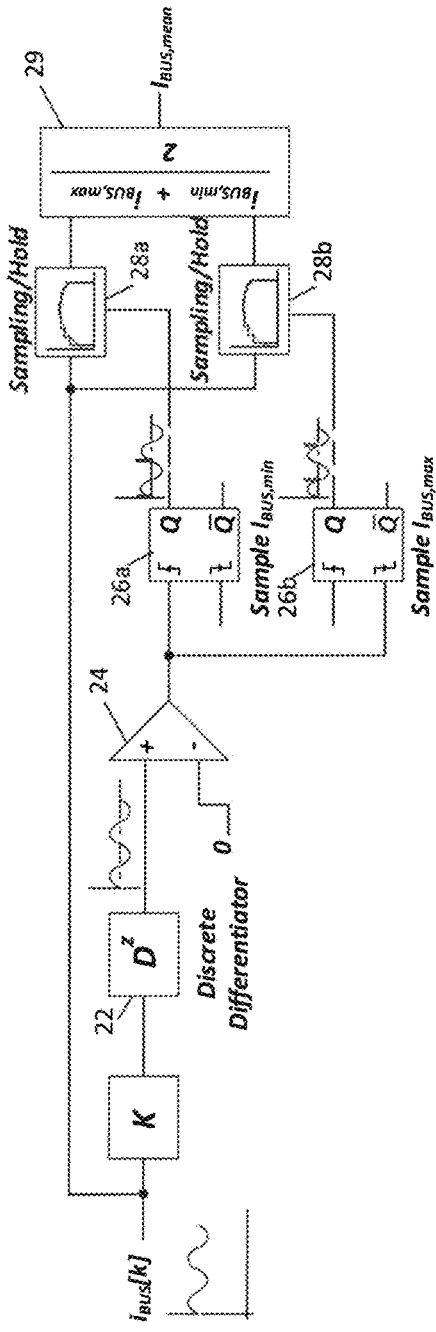
FIG. 3B is a diagram of a mean value calculator, according to an embodiment for use with a CSI.

FIG. 3A shows an example of how the mean value calculator 20 finds the mean value of the DC-bus voltage. In this example, the mean value of the DC-bus voltage is calculated using the following equation:

$$v_{BUS,mean} = \frac{v_{BUS,max} + v_{BUS,min}}{2} \qquad \text{Equation 1}$$

wherein the mean value calculator determines the maximum and minimum of the DC-bus voltage.

According to FIG. 3A, the discrete value of the DC-bus voltage is used to calculate its mean value. The discrete value of the DC-bus voltage is fed into a discrete differentiator 22 to extract the ripple of the DC-bus voltage. The discrete differentiator produces a noise-free signal. This may be accomplished by removing the high frequency switching noise from the DC-bus voltage by sampling the signal every switching cycle. The signal at the output of the discrete differentiator is 90° out of phase with the double frequency ripple of the DC-bus voltage. The zero crossings of this signal are then detected through a comparator 24. Two mono-stable multi-vibrators 26a, 26b then create the sampling instants of the DC-bus voltage sample/holds 28a, 28b based on the rising and falling edge of the comparator. These values correspond to the minimum and maximum of the DC-bus voltage. Finally, the mean value is calculated 29 using the minimum and maximum values. The mean value calculator may be implemented using a technology as may be suitable or convenient, such as, for example, a FPGA.

FIG. 1A shows a generalized schematic of the system model, from which the average model may be derived as the following:

$$\frac{di_{inv}}{dt} = \frac{-R_1}{L_1} i_{inv} + \frac{1}{L_1} v_{BUS}(2d-1) - \frac{1}{L_1} v_C \qquad \text{Equation 2}$$

$$\frac{di_g}{dt} = \frac{-R_2}{L_2} i_g + \frac{1}{L_2} v_C - \frac{1}{L_2} v_g \qquad \text{Equation 3}$$

$$\frac{dv_C}{dt} = \frac{1}{C} i_{inv} - \frac{1}{C} i_g \qquad \text{Equation 4}$$

$$\frac{dv_{BUS}}{dt} = \frac{1}{C_{BUS}} i_{dc} - \frac{1}{C_{BUS}} i_{inv}(2d-1) \qquad \text{Equation 5}$$

The DC-bus voltage control embodiments described herein are based on droop control using reverse proportional gain. Thus, the controller output decreases as positive error increases, and the controller output increases as the negative error increases.

A block diagram of one embodiment is shown in FIG. 4A, wherein the droop controller 30 is inserted into the closed loop. According to this embodiment, the amplitude of the reference value for the grid current is calculated based on the droop controller as follows:

$$I_{ref} = k_i I_{max} - k_{droop} e_v \quad \text{Equation 6}$$

where $k_i$ is used to scale $I_{max}$, $k_{droop}$ is the droop gain and $e_v$ is given by:

$$e_v = V_{max} - v_{BUS,mean} \quad \text{Equation 7}$$

The droop controller provides substantially instant action during transients, which considerably increases the speed of the control system. Also, it improves the steady-state behavior of the grid-connected VSI, as described below.

In this embodiment, the controller does not try to track a reference signal applied to the control loop. Instead, the maximum value of the DC-bus voltage is applied as the external signal to the voltage control loop and the equilibrium point of the system is determined based on the intersection of the droop controller profile and the load profile (e.g., FIG. 4C).

During steady-state, the profile of the droop controller is given by:

$$\text{droop profile: } I_{ref}^{ss} = k_i I_{max} - k_{droop} e_v \quad \text{Equation 8}$$

The load profile during steady-state is determined by the DC power balance between the input and the output of the grid-connected VSI. The input and output powers are given by:

$$P_{in,avg} = V_{mean} I_{dc} \quad \text{Equation 9}$$

$$P_o = \frac{1}{2} I_{ref}^{ss} V_g \quad \text{Equation 10}$$

where $I_{dc}$ is the DC component of $i_{dc}$, and $V_g$ is the amplitude of the grid voltage. Thus, the load profile is derived as:

$$\text{Load profile: } I_{ref}^{ss} = \frac{2I_{dc}}{V_g}(V_{max} - e_v) \quad \text{Equation 11}$$

Figure 4C:
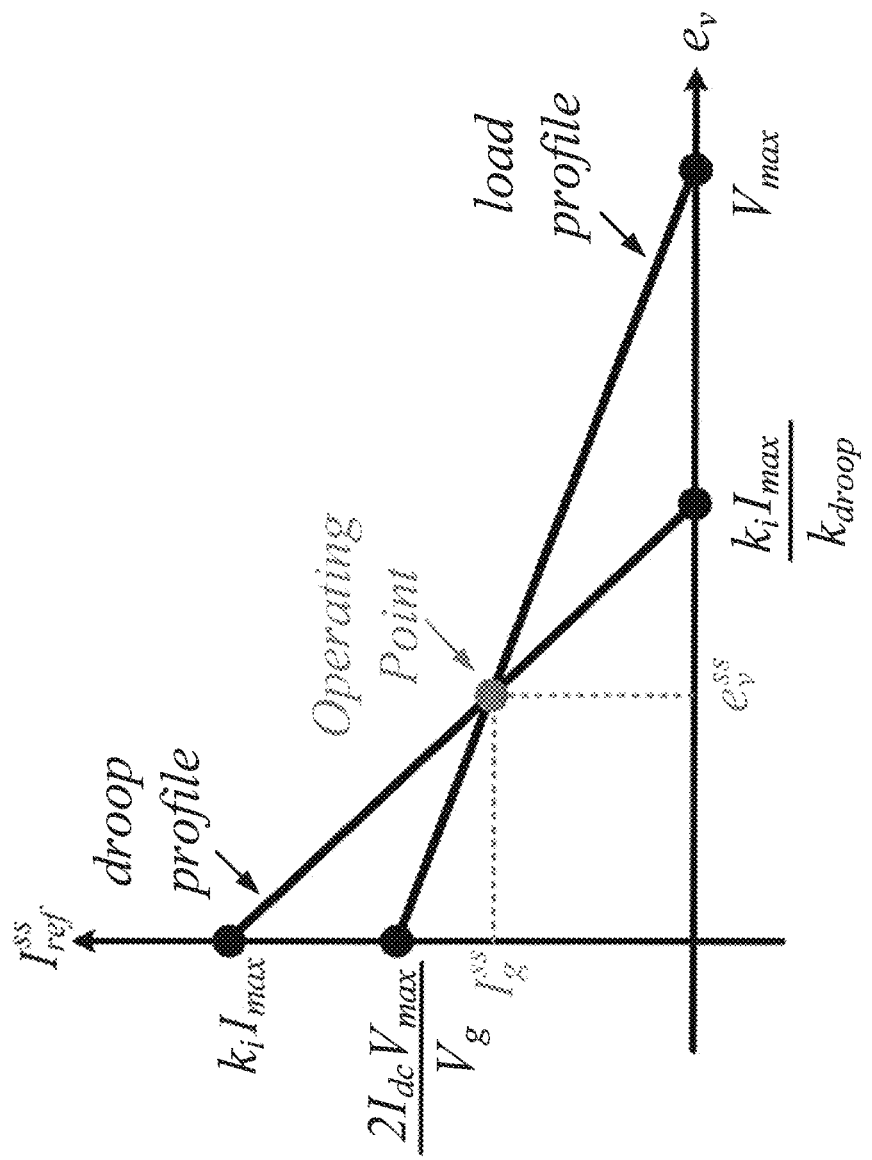
FIG. 4C is a plot showing how the steady-state operating point of the DC-bus voltage control system shown in FIG. 4A is determined using droop control.

The plot of FIG. 4C shows the intersection of the load profile and the droop profile for a typical load. According to this figure, one line represents the load profile and the other shows the droop profile. The intersection of these lines determines the steady-state operating point of the closed-loop control system. This plot is informative in designing the gain of the droop controller. The closed-loop system potentially has a stable equilibrium if the two lines intersect; otherwise there is no equilibrium point for the closed-loop control system. If there is an intersection point, it is derived as follows:

$$e_v^{ss} = \frac{2I_{dc}V_{max} - k_i I_{max} V_g}{2I_{dc} - k_{droop} V_g} \quad \text{Equation 12}$$

This point corresponds to the steady-state DC-bus voltage given by:

$$V_{mean}^{ss} = \frac{k_i I_{max} V_g - k_{droop} V_{max} V_g}{2I_{dc} - k_{droop} V_g} \quad \text{Equation 13}$$

According to Equation 13, the final value of the steady-state DC-bus voltage depends on different parameters, such as the droop controller characteristic ($k_i I_{max}$, and $k_{droop}$) as well as the input current and output voltage.

The coefficients of the droop controller may be designed such that the two lines have an intersection. Therefore, two conditions are considered:

(1) If $(k_i I_{max} > 2I_{dc} V_{max}/V_g)$, the droop controller must satisfy the following condition in order to guarantee an intersection:

$$k_i I_{max} > \frac{2I_{dc} V_{max}}{V_g} \mapsto k_{droop} > \frac{k_i I_{max}}{V_{max}} \quad \text{Equation 14}$$

(2) If $(k_i I_{max} < 2I_{dc} V_{max}/V_g)$, the droop controller must satisfy the following condition in order to guarantee an intersection:

$$k_i I_{max} < \frac{2I_{dc} V_{max}}{V_g} \mapsto k_{droop} < \frac{k_i I_{max}}{V_{max}} \quad \text{Equation 15}$$

Either of the aforementioned conditions can guarantee an intersection to create a potentially stable equilibrium. However, the first condition may be selected to design the droop profile, since the input power and id, can be zero, whereas the assumption of the second condition may not be satisfied. The droop gains may be designed such that all operating conditions are taken into consideration. In this case, $k_i I_{max}$ is designed as follows:

$$k_i I_{max} > \frac{2I_{dc}^{max} V_{max}}{V_g^{min}} \quad \text{Equation 16}$$

Where Equation 16 ensures that the assumption of the first condition is satisfied for the entire range of operation. Thus, the droop controller gain is found as:

$$k_{droop} > \frac{2I_{dc}^{max}}{V_g^{min}} \quad \text{Equation 17}$$

where Equation 16 and Equation 17 guarantee an equilibrium point for the closed-loop system with the droop controller.

In some applications, it may be preferable to have a constant DC-bus voltage. An example of such an application is when the DC-bus feeds other converters, such as in hybrid renewable energy power conditioning systems. Thus, the droop control method may be made adaptive, such that it will regulate the DC-bus voltage to a constant value. Changing the droop gain provides such a control approach with the capability of regulating the DC-bus voltage.

Figure 5B:
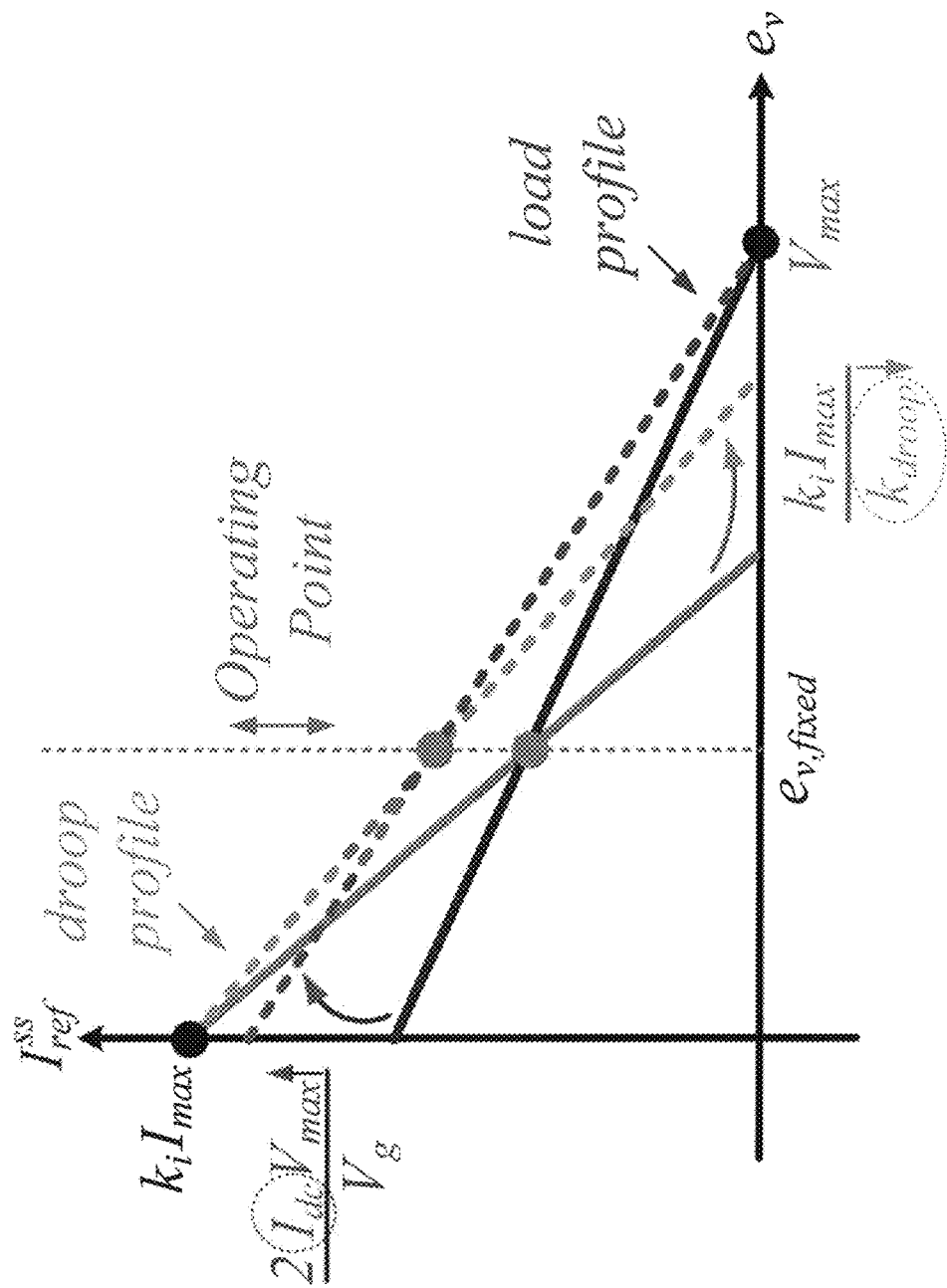
FIG. 5B is a plot showing how the steady-state operating point of the DC-bus voltage control system is determined with adaptive droop control.

An adaptive droop controller is illustrated in the embodiment of FIG. 5A. According to this figure, the intersection point between the load profile and droop profile determines the error between the mean voltage and the maximum voltage. Furthermore, since the maximum voltage is a fixed value, the error actually determines the mean voltage. The DC-bus voltage can be made constant by placing the intersection point between the load profile and droop profile at a fixed error value, which is shown in FIG. 5B as a vertical line. In order to place the intersection points along the vertical line, the droop gain must be varied adaptively. This may be achieved by equating the load profile and droop profile equations with a fixed voltage error. This determines the droop gain, which is given by:

$$k_{droop} = \frac{k_i I_{max}}{e_v} - 2\frac{I_{DC} V_{max}}{e_v V_g} + 2\frac{I_{DC}}{V_g} \qquad \text{Equation 18}$$

where $I_{DC}$ and $V_g$ represent the DC-bus current (DC value) and grid voltage amplitude, respectively. Equation 18 describes the droop controller gain as a function of $I_{DC}$ and $V_g$.

Other applications, such as some renewable energy power conditioning systems, do not require that the DC-bus voltage be regulated to a specific value. For such applications, it may be more beneficial to generate a variable DC-bus voltage that reduces the overall power losses of the system. Thus, an optimized adaptive droop controller can achieve a very high efficiency by varying the DC-bus voltage to decrease overall system power losses. For example, in a grid-connected VSI, the inductor(s) in the output filter account for most of the power loss. This loss is usually higher than switching/conduction losses. Therefore, an optimized adaptive droop controller embodiment identifies the operating point for a particular droop and load profile that is most able to reduce power losses across the output filter inductor.

Power losses that occur across the output filter inductor can be divided into two main categories: ohmic losses and core losses. Both types of losses are proportional to the output inductor current ripple. The overall losses related to the output inductor current ripple are given by:

$$P_{losses} = P_{ohmic} + P_{core} = \underbrace{R_{lf} I_{lf}^2 + R_{hf} I_{hf}^2}_{\text{Ohmic Losses}} + \underbrace{K_{fe}(\Delta B)^\beta A_c l_m}_{\text{Core Losses}} \qquad \text{Equation 19}$$

where $R_{lf} I_{lf}^2$ represents low frequency ohmic losses, $R_{hf} I_{hf}^2$ represents high frequency ohmic losses, $K_{fe}$ is a constant of proportionality that depends on the operating frequency, $\Delta B$ is the peak ac flux density, $\beta$ represents an exponent determined by the core manufacturer's published data, $A_c$ represents the core cross-sectional area, and $l_m$ represents the core mean magnetic path length. The low frequency ohmic losses cannot be reduced due to the fact that the load determines the low frequency current. However, both the high frequency ohmic losses and core losses may be greatly reduced by decreasing the output inductor current ripple. Both the high frequency ohmic losses and the core losses are functions of the output inductor current ripple, where the current ripple may be defined as follows:

$$\Delta I = \frac{(v_{BUS} - v_g) dT}{L} \qquad \text{Equation 20}$$

where $v_{BUS}$ represents the DC-bus voltage, $v_g$ represents the grid voltage, d represents the duty ratio, T represents the switching period, and L represents the output filter inductance. The duty ratio, d, is determined by the controller; the grid voltage, $v_g$, is determined by a utility grid operator, while the switching period T and the output filter inductance L are constant. Thus, the only variable that can be used to decrease the output inductor current ripple is the DC-bus voltage, $v_{BUS}$. Since the output current ripple is a function of the difference between the grid voltage and the DC-bus voltage, reducing this difference through control of the mean DC-bus voltage would result in reducing the output inductor current ripple and its resulting power losses.

Figure 6:
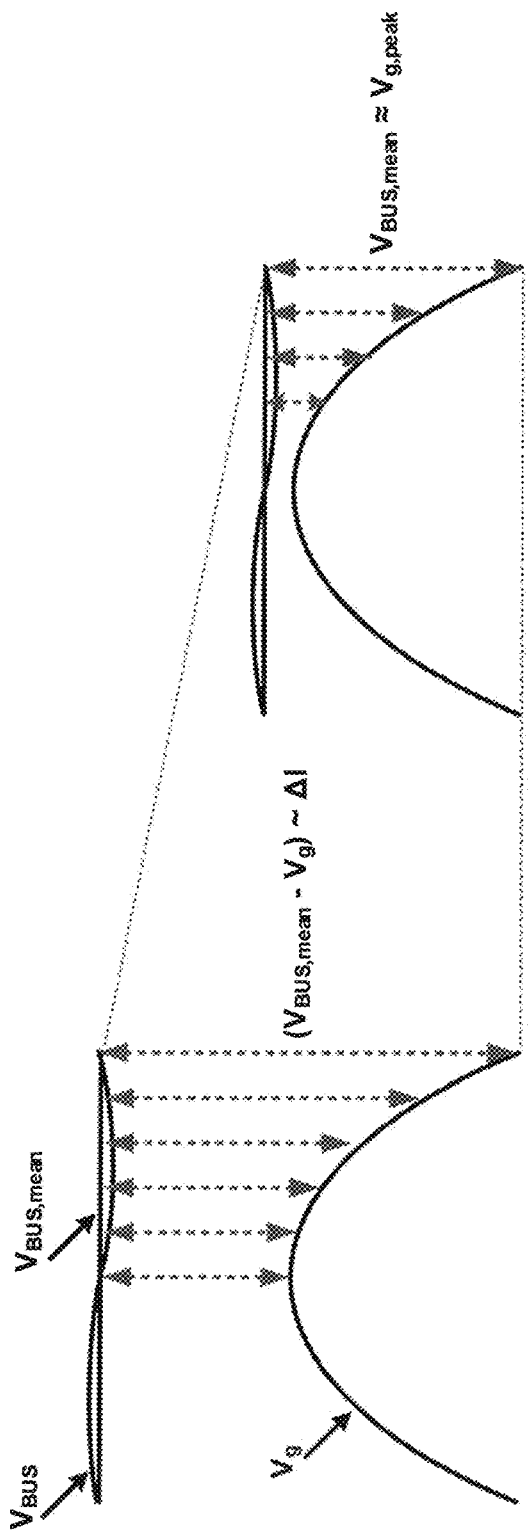
FIG. 6 is a diagram showing that bringing the mean DC-bus voltage closer to the peak of the grid voltage reduces output inductor current ripple.

According to Equation 20, the voltage across the output inductor determines the output inductor current ripple. This voltage can be found through the difference between the voltage across the DC-bus capacitor and the grid voltage. However, since an LCL filter contains two inductors, and the first inductor is larger than the second inductor (due to the fact that when there is a large difference between the two inductors, the resonant frequency is higher than when they are the same), the majority of the output current ripple occurs across the first inductor. The voltage across the first filter inductor is directly determined by the difference between the DC-bus voltage and the grid voltage. Since the grid voltage cannot be controlled, the mean DC-bus voltage may be controlled such that it is as close to the grid voltage as possible. However, it is important to consider that the mean DC-bus voltage must always be greater than the grid voltage so that the direction of power flow is from the VSI into the utility grid. To minimize the difference between the DC-bus voltage and the grid voltage while preserving the direction of power flow, the optimized adaptive droop controller sets the mean DC-bus voltage as close as possible to the peak value of the grid voltage, without preventing the flow of power from the VSI into the grid, as shown in FIG. 6. From FIG. 6 it can be seen that bringing the mean DC-bus voltage as close as possible to the peak of the grid voltage reduces the output current ripple.

Figure 7:
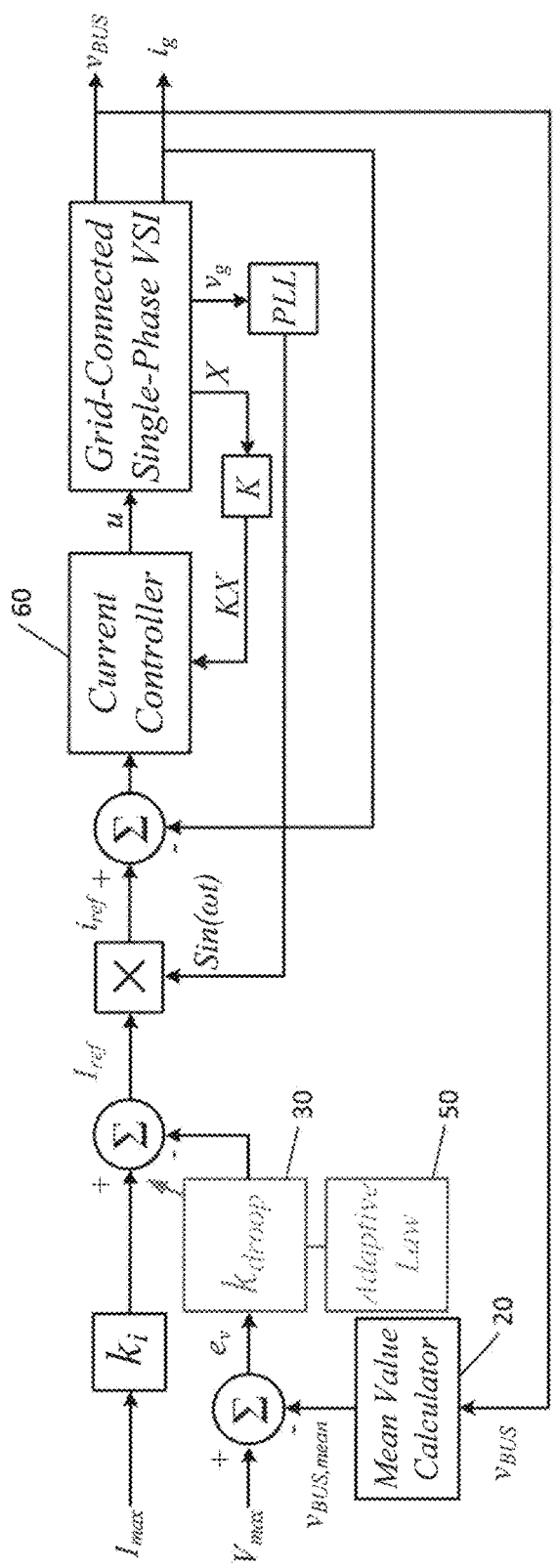
FIG. 7 is a diagram showing a closed-loop DC-bus voltage control system with optimized adaptive droop controller, according to one embodiment.

A generalized block diagram of an optimized adaptive droop controller embodiment is illustrated in FIG. 7, which includes a mean value calculator 20, a droop controller 30, and an adaptive law implementation 50. By adaptively changing the droop gain, the operating point can be placed where it will decrease the mean DC-bus voltage as the grid voltage decreases. By decreasing the mean DC-bus voltage, the error between the mean DC-bus voltage and maximum DC-bus voltage increases. Thus, operation of the optimized adaptive droop controller includes increasing the error when the grid voltage decreases such that the mean DC-bus voltage is set very close to the peak of the grid voltage. The result is a lower output inductor current ripple and reduced power losses.

To calculate the optimized adaptive law, the rms value of the output current ripple must be found. The rms value of the output current ripple may be found according to the following:

$$\Delta I_{rms} = \frac{\Delta I}{\sqrt{3}} \qquad \text{Equation 21}$$

Using Equation 21, the high frequency ohmic losses can be found using the following:

$$P_{ohmic,highfreq} = R_{hf} I_{hf}^2 = R_{hf} \Delta I_{rms}^2 = \frac{R_{hf} \Delta I^2}{3} \qquad \text{Equation 22}$$

By substituting Equation 20 into Equation 22, the high frequency ohmic losses may be rewritten as follows:

$$P_{ohmic,highfreq} =$$

$$R_{hf}I_{hf}^2 = R_{hf}\Delta I_{rms}^2 = \frac{R_{hf}}{3}\left[\frac{(V_{BUS} - V_{g,max})^2 d_{max}^2 T^2}{L^2}\right]$$

Equation 23 where the maximum duty ratio is given by:

$$d_{max} = \frac{V_{BUS} + V_{g,max}}{2V_{BUS}}$$

Equation 24

Therefore, the high frequency ohmic losses are given by:

$$P_{ohmic,highfreq} = R_{hf}I_{hf}^2 = R_{hf}\Delta I_{rms}^2 = \frac{R_{hf}}{3}\left[\frac{(V_{BUS}^2 - V_{g,max}^2)^2}{4V_{BUS}^2 L^2 f_{sw}^2}\right]$$

Equation 25

The core losses are defined as follows:

$$P_{core} = K_{fe}\left[\frac{(V_{BUS} - V_{g,max})d_{max}T}{nA_c}\right]^\beta A_c l_m$$

Equation 26

Thus, the core losses can be rewritten as:

$$P_{core} = K_{fe}\left[\frac{(V_{BUS}^2 - V_{g,max}^2)}{nA_c f_{sw}}\right]^\beta A_c l_m$$

Equation 27

The power losses may be minimized by finding their partial derivative with respect to the DC-bus voltage and setting it to zero. This results in the following optimal operating point:

$$V_{BUS}^* = V_{g,max}$$

Equation 28

However, this operating point is practical only if there is no voltage drop across the output filter, the inverter gain is unity, and the low frequency ripple on the DC-bus voltage is negligible. Therefore, for a grid-connected VSI with an output filter, these factors should be taken into account. Thus, the voltage drop across the output filter, the SPWM gain, and the low frequency ripple are added to the DC-bus voltage in order to find the closest point to the optimal operating point. The SPWM inverter has a gain of unity (for linear modulation region) and the voltage drop across the inductor is given by:

$$\vec{V}_L = \vec{X}_L \vec{I}_g = j\omega_l L I_g,$$

Equation 29

Where $L = L_1 + L_2$ and $\omega_l$ is the line frequency.

Also, the low frequency ripple of the output voltage is given by:

$$\Delta V_{BUS} = \frac{P_o}{\omega_l C_{BUS} V_{DC}} = \frac{V_g I_g}{2\omega_l C_{BUS} V_{DC}}$$

Equation 30 where $V_{DC}$ is the DC value of $v_{BUS}$.

Thus, to counteract these voltage drops, the mean DC-bus voltage is determined to be the following:

$$V_{BUS,mean} = \sqrt{V_g^2 + L^2 \omega_l^2 I_g^2} + \frac{V_g I_g}{4\omega_l C_{BUS} V_{BUS,mean}},$$

Equation 31

Solving this equation for $V_{BUS,mean}$ results in the following equation, which represents the optimal DC-bus voltage:

$$V_{BUS,mean}^* = \frac{1}{2}\left[\sqrt{\frac{C_{BUS}I_g^2 L^2 \omega_l^2 + I_g V_{g,max} + C_{BUS}V_{g,max}^2 \omega_l}{C_{BUS}\omega_l}} + \sqrt{I_g^2 L^2 \omega_l^2 + V_{g,max}^2}\right]$$

Equation 32

Figure 8:
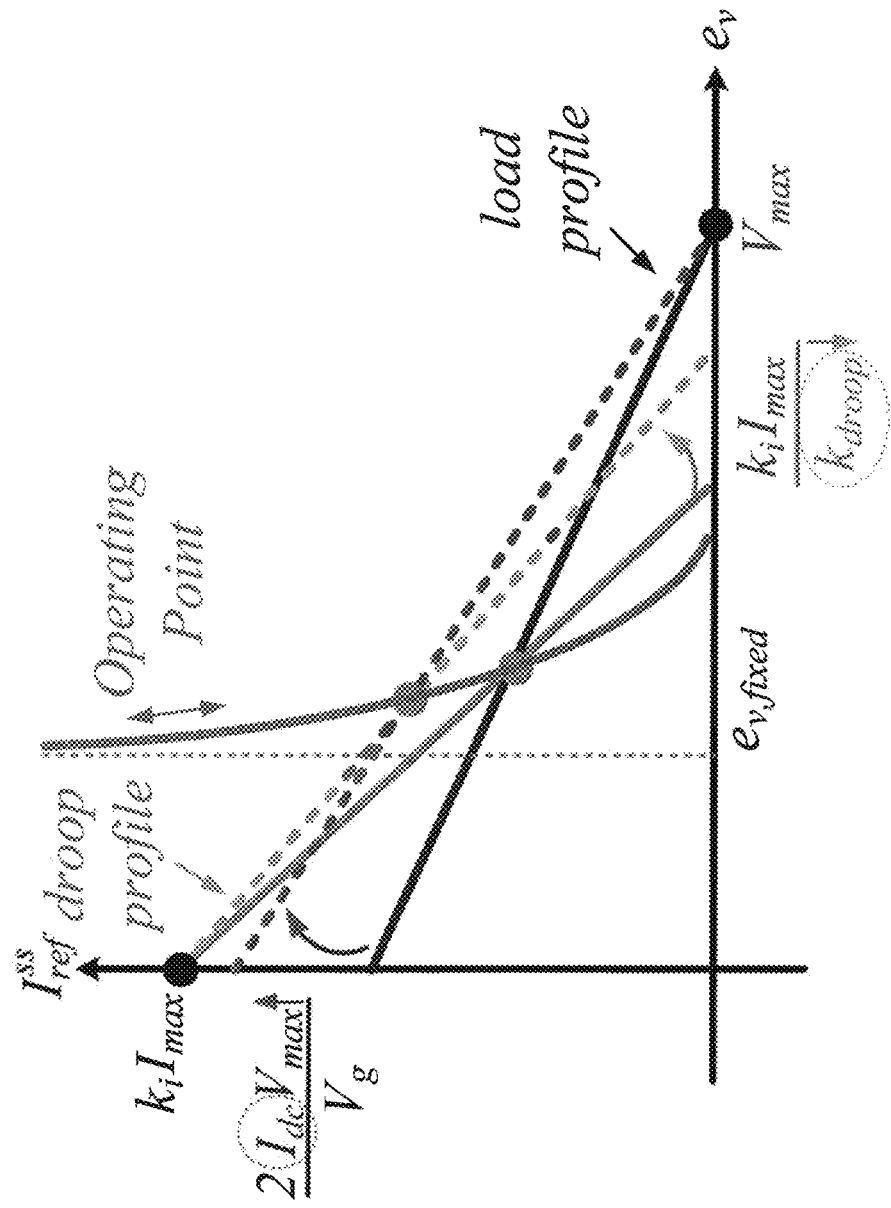
FIG. 8 is a plot showing how the steady-state operating point of a DC-bus voltage control system may be determined with optimized adaptive droop control, according to one embodiment.

The plot of FIG. 8 shows the trajectory of the optimal operating point along with the droop profile. According to this figure, the DC-bus voltage is at its maximum (and $e_v$ is at its minimum) at full-load, where the inductor voltage drop and the low frequency ripple are at their maximum values. As the load decreases, the DC-bus voltage is reduced (and $e_v$ increases) in order to keep the inductor ripple and in turn the losses as small possible.

The adaptive law for the droop gain may be derived using Equation 32 and Equation 18 as follows:

$$K_{droop}^* = \frac{K_i I_{max}}{V_{max} - V_{DC,mean}^*} - 2\frac{I_{DC} V_{max}}{(V_{max} - V_{DC,mean}^*)V_g} + 2\frac{I_{DC}}{V_g}$$

Equation 33

As shown in FIG. 8, the adaptive law 50 (see FIG. 7) minimizes current ripple by adaptively changing the droop gain according to the droop and load profiles.

Figure 9A:
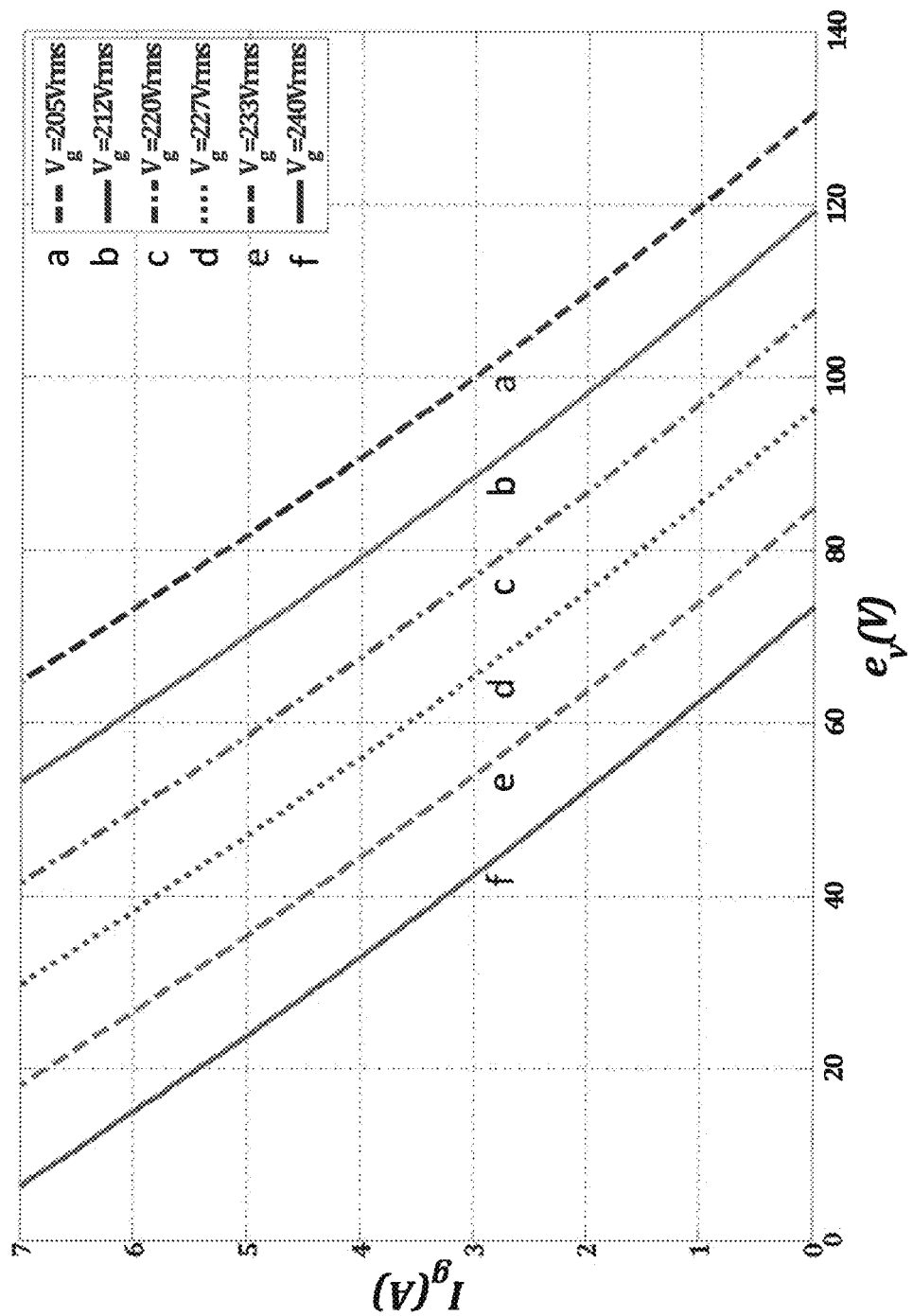
FIG. 9A is a plot showing optimal trajectories of an optimized adaptive droop control method for different grid voltages.
Figure 9B:
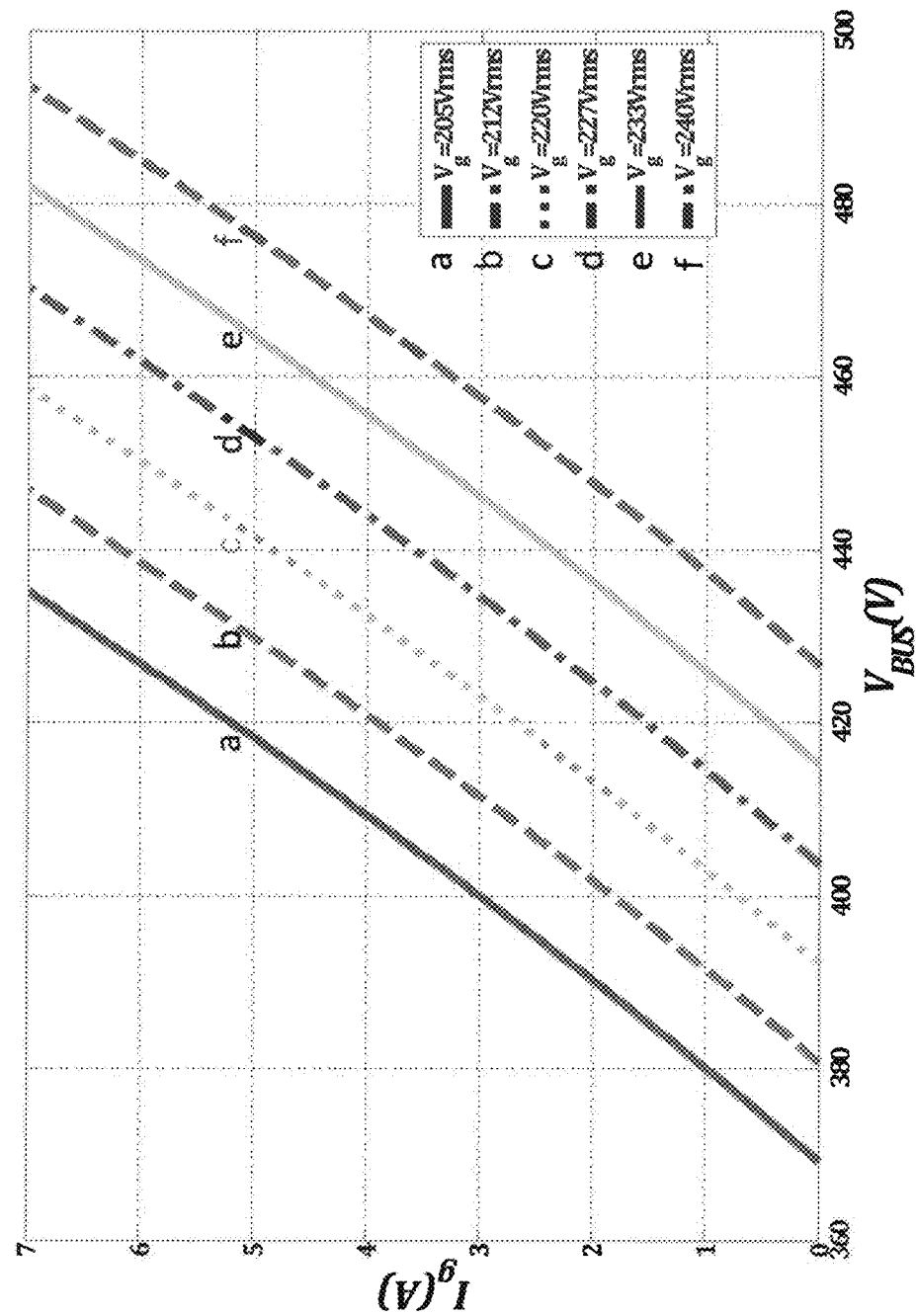
FIG. 9B is a plot showing how the DC-bus voltage may be determined by an optimized adaptive droop control method for different grid voltages and loads.

The plot of FIG. 9A illustrates different optimal trajectories for different grid voltages. The intersection of these trajectories and the load profile determines the optimal operating point of the DC-bus voltage. The plot of FIG. 9B shows the optimal value of the DC-bus voltage for different load conditions and different grid voltages.

EXAMPLE 2

Experimental Results with Voltage Source Inverter

DC-bus voltage adaptive droop controllers based on the embodiments shown in FIGS. 5A and 7 were implemented. Simulations were conducted using PSIM, and a 1 kW experimental prototype was constructed and tested. The parameters are shown in Table 1, and the results are shown in FIGS. 10, 11, 12A-12B, and 13-17.

TABLE 1

VSI Specifications for DC Bus Voltage Control

| Symbol | Parameter | Value |
|---|---|---|
| Po | Output Power | 1 kW |
| $v_{dc}$ | Input Voltage | 400-450 VDC |
| $v_g$ | Grid Voltage | 85-264 VAC |
| $f_{sw}$ | Switching Frequency | 20 kHz |
| $I_{o,\,max}$ | Maximum Output Current | 10 A |
| $L_1$ | Inverter Side Inductance | 2.56 mH |
| $R_1$ | Inverter Side Resistance | 35 mΩ |
| $L_2$ | Grid Side Inductance | 0.307 mH |

TABLE 1-continued

VSI Specifications for DC Bus Voltage Control

| Symbol | Parameter | Value |
|---|---|---|
| $R_2$ | Grid Side Resistance | 15 mΩ |
| C | LCL-Filter Capacitance | 10 μF |
| $C_{BUS}$ | DC-BUS Capacitance | 270 μF |

Figure 10:
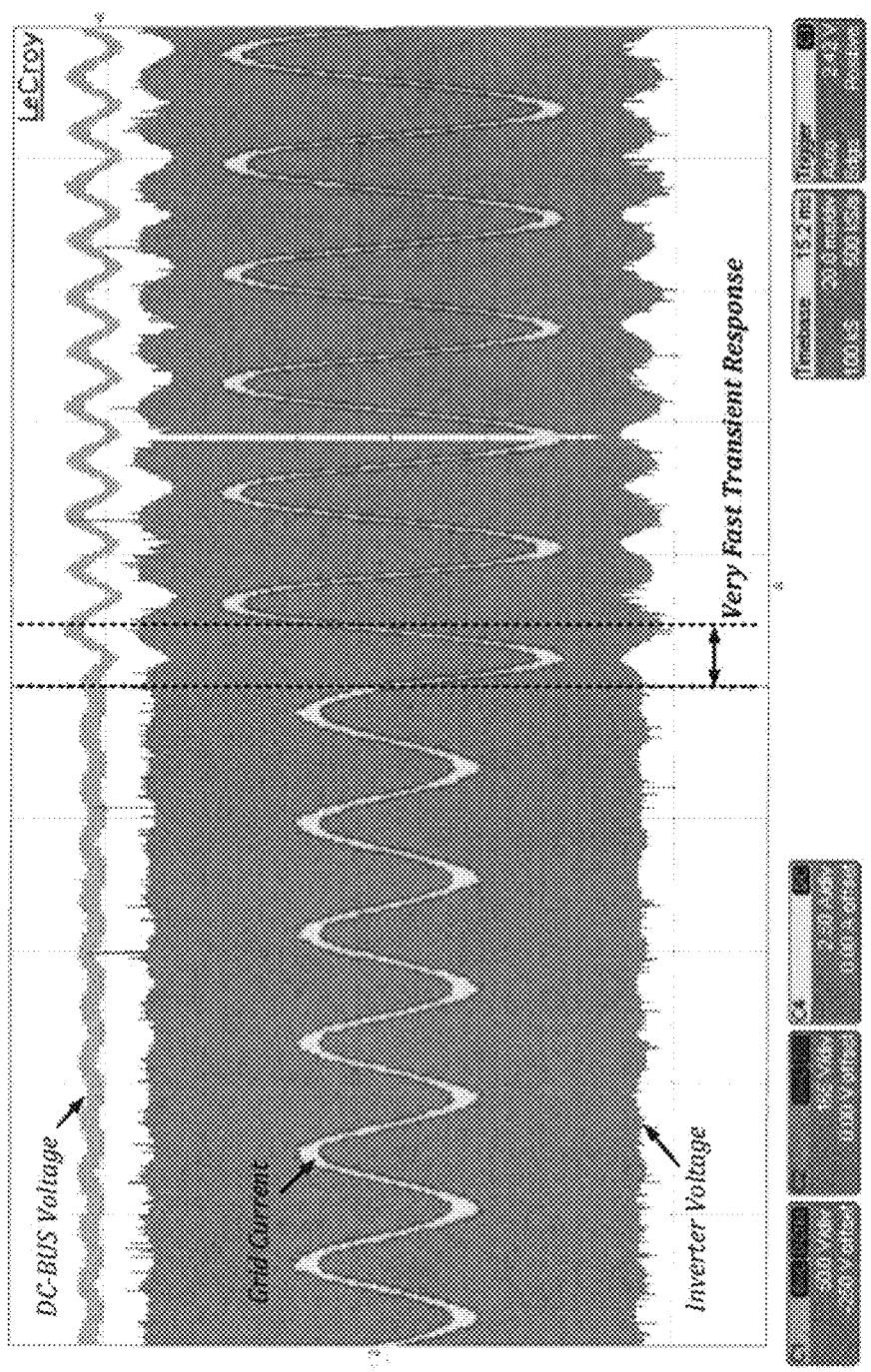
FIG. 10 is a plot of experimental data showing transient response of a DC-bus voltage adaptive droop controller embodiment during a positive step change.

FIG. 10 shows the transient response of the DC-bus voltage adaptive droop controller, which produced a constant DC-bus voltage under a positive step change of 50%. The figure shows that the controller responded immediately to the step change and also maintained the DC-bus voltage constant.

Figure 11:
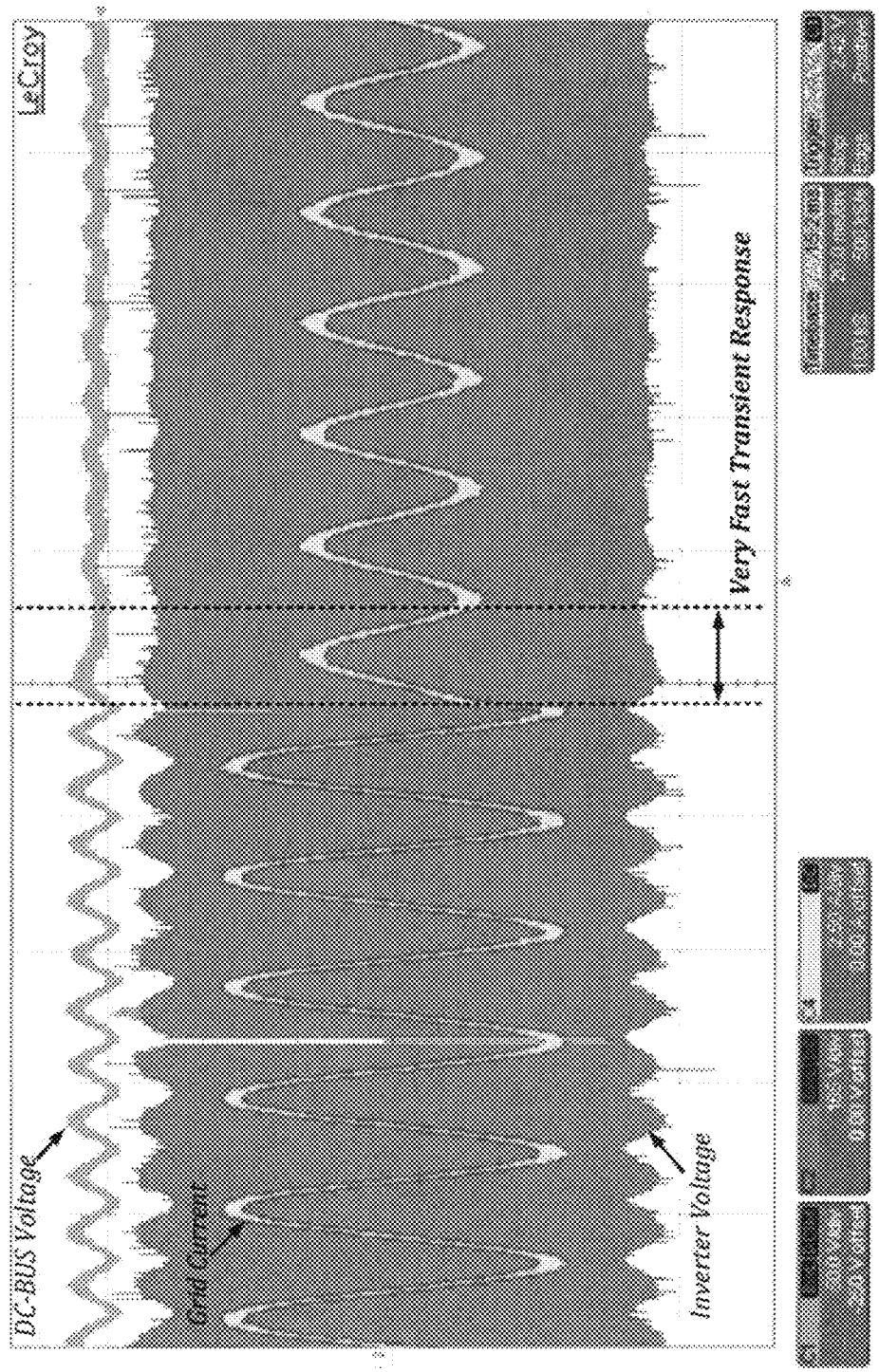
FIG. 11 is a plot of experimental data showing transient response of a DC-bus voltage adaptive droop controller embodiment during a negative step change.

FIG. 11 shows the transient response of the DC-bus voltage adaptive droop controller, which produced a constant DC-bus voltage under a negative step change of 50%.

Figure 12A:
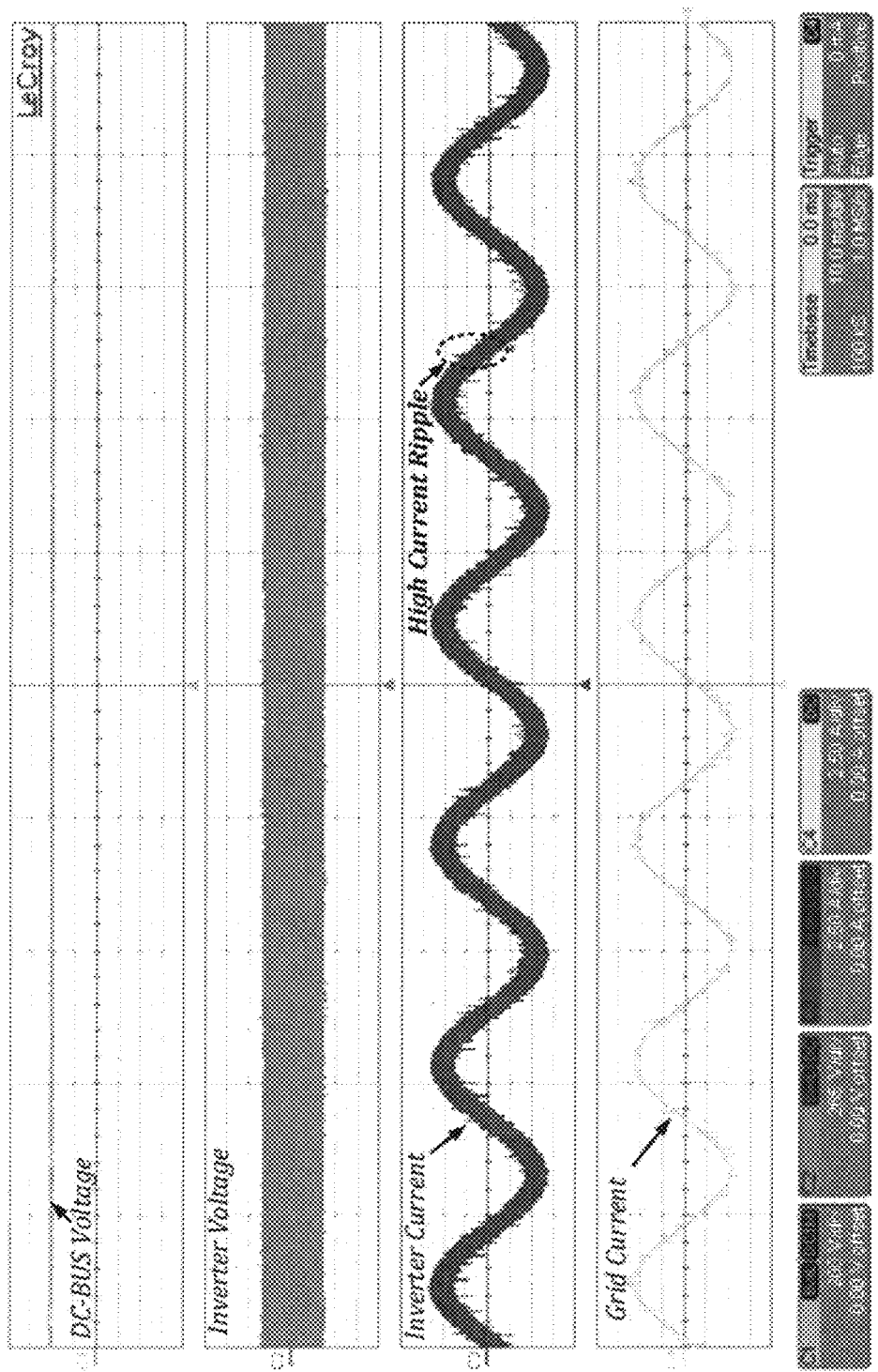
FIG. 12A is a plot of experimental data showing current ripple of a DC-bus voltage adaptive droop controller embodiment.
Figure 12B:
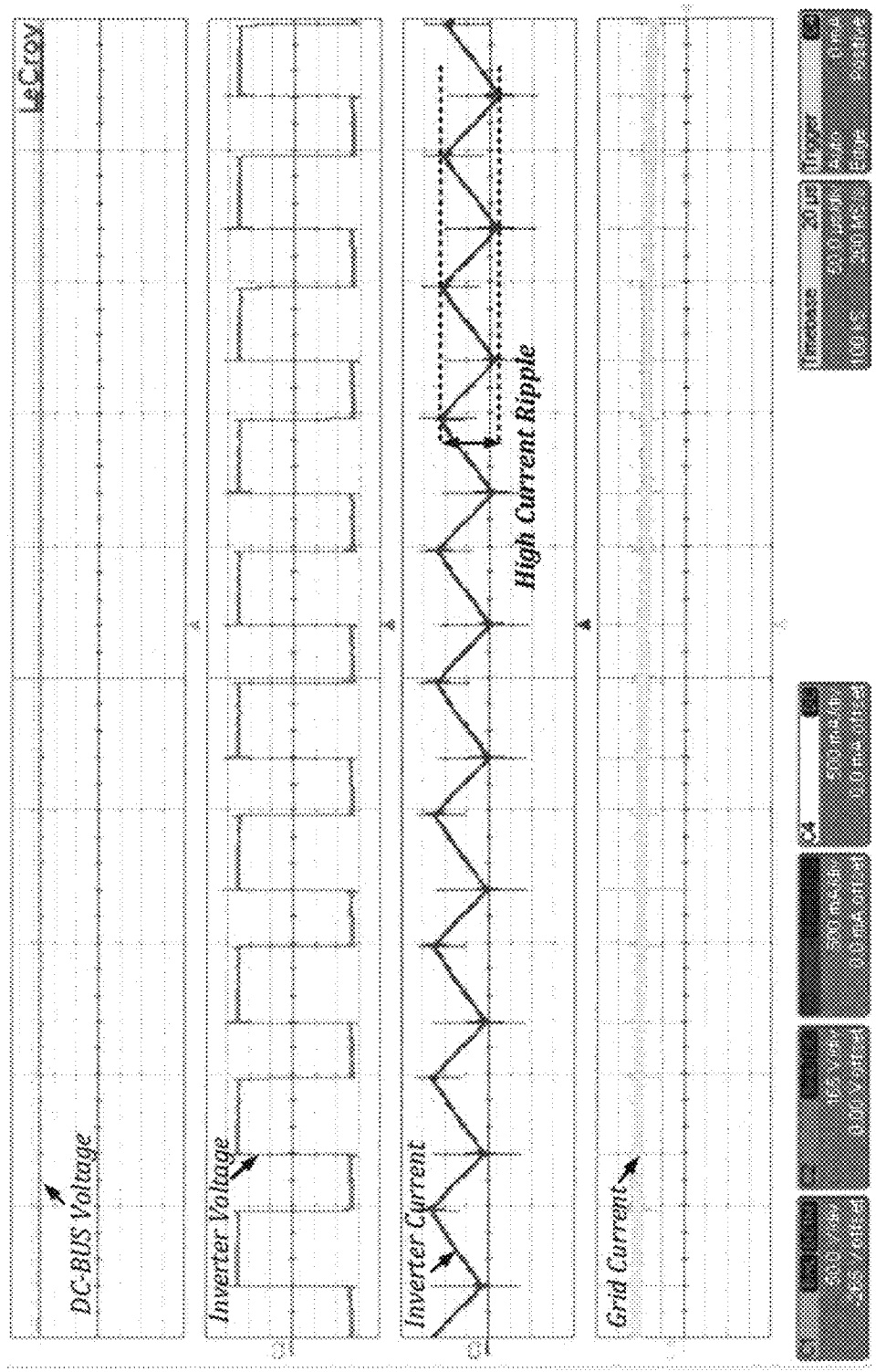
FIG. 12B is an enlargement of part of FIG. 12A.

These results for the adaptive droop controller demonstrated a very fast and stable transient performance. However, the controller is responsible for maintaining a constant DC-bus voltage. The current ripple across the inverter-side inductor is shown in FIGS. 12A and 12B. This ripple contributes to the system power losses.

Figure 13:
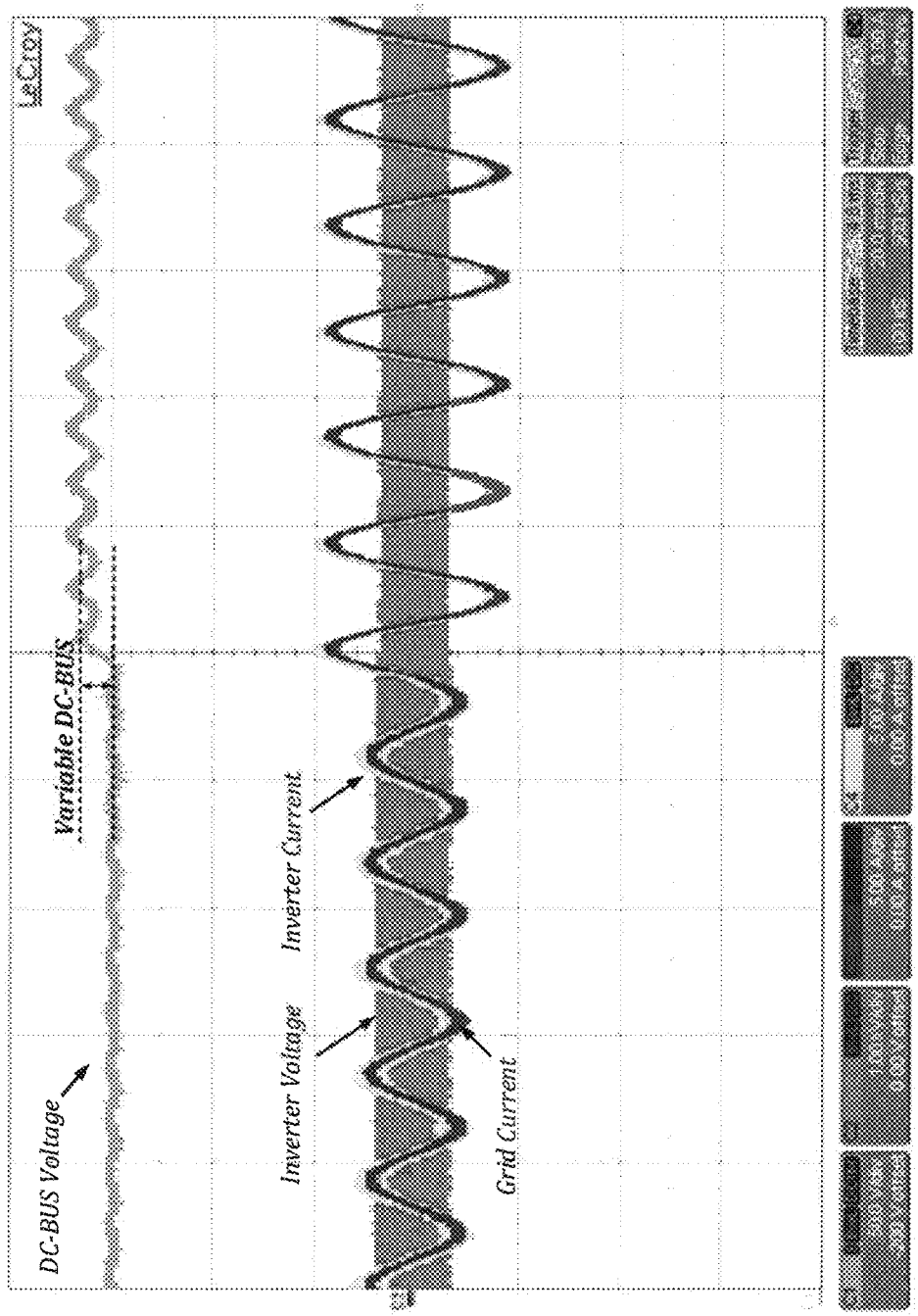
FIG. 13 is a plot of experimental data showing transient response of a DC-bus voltage optimized adaptive droop controller embodiment during a positive step change.
Figure 14:
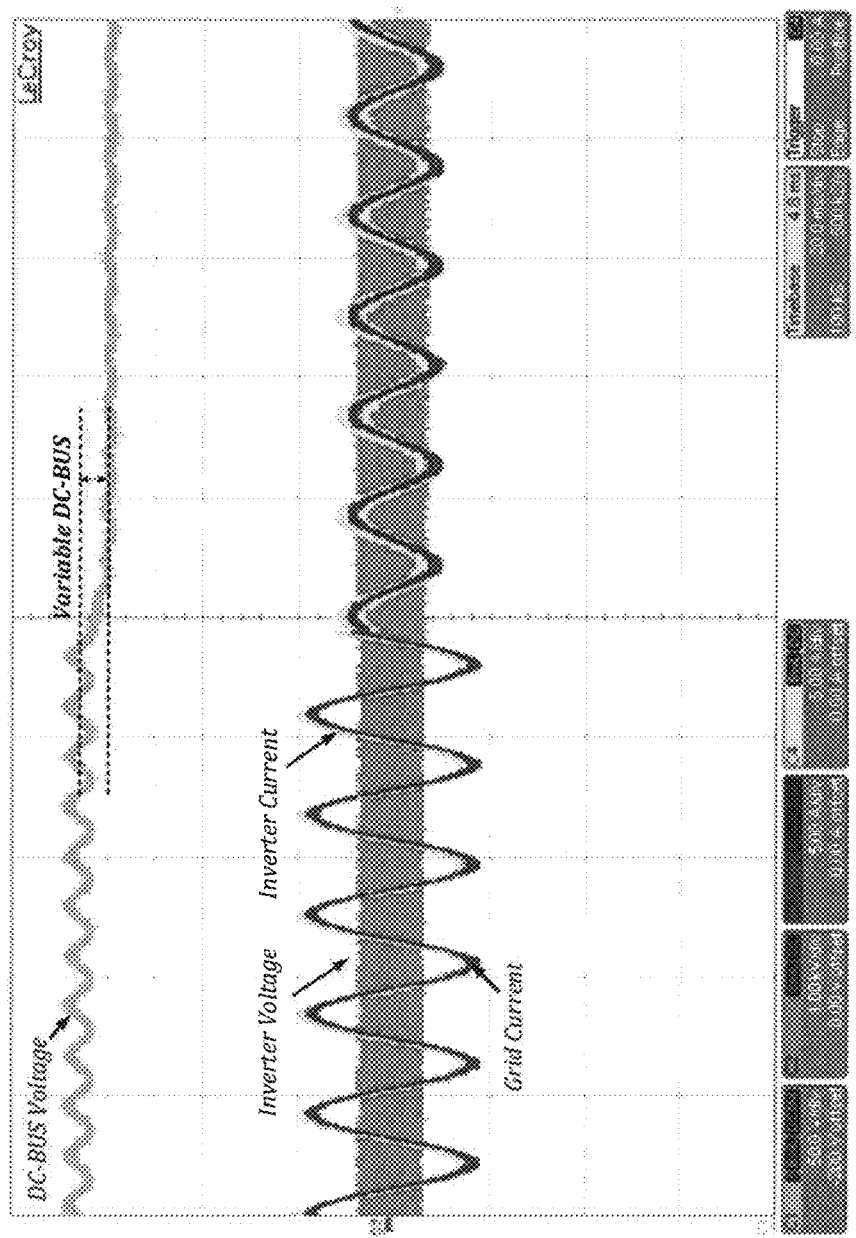
FIG. 14 is a plot of experimental data showing transient response of a DC-bus voltage optimized adaptive droop controller embodiment during a negative step change.

Accordingly, a DC-bus voltage adaptive droop controller, based on the embodiment shown in FIG. 7, was implemented. The optimized controller reduced the ripple and, in turn, reduced power losses of the VSI. FIG. 13 shows the transient response of the DC-bus voltage optimized adaptive droop controller under a positive step change of 50%. According to this figure, the optimized controller determined the optimal value of the DC-bus voltage, such that the current ripple of the inverter-side filter inductor was minimized. Also, the figure shows a very fast transient response due to the immediate action of the controller. FIG. 14 shows the transient response of the optimized controller under a negative step change of 50%.

Figure 15:
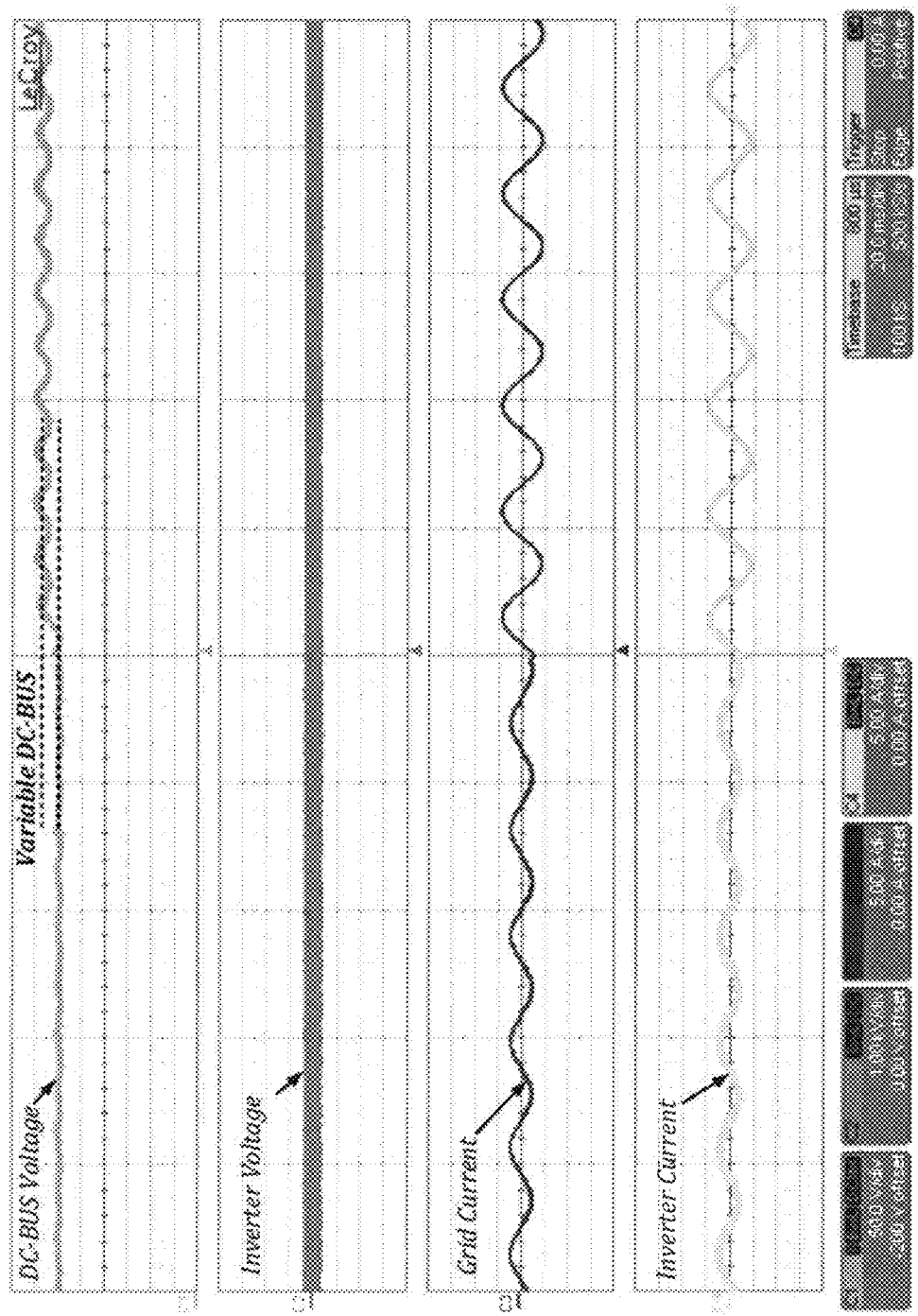
FIG. 15 is a plot of experimental data showing inverter current transient response of a DC-bus voltage optimized adaptive droop controller embodiment during a positive step change.
Figure 16:
FIG. 16 is a plot of experimental data showing inverter current transient response a DC-bus voltage optimized adaptive droop controller embodiment during a negative step change.

FIG. 15 shows the transient response of the DC-bus voltage optimized adaptive droop controller, including the inverter current, under a positive step change of 50%, and FIG. 16 shows the transient response, including the inverter current, under a negative step change of 50%. These results confirm that the current delivered to the utility grid is of very high quality and that the closed-loop system remains stable under severe transients.

Figure 17:
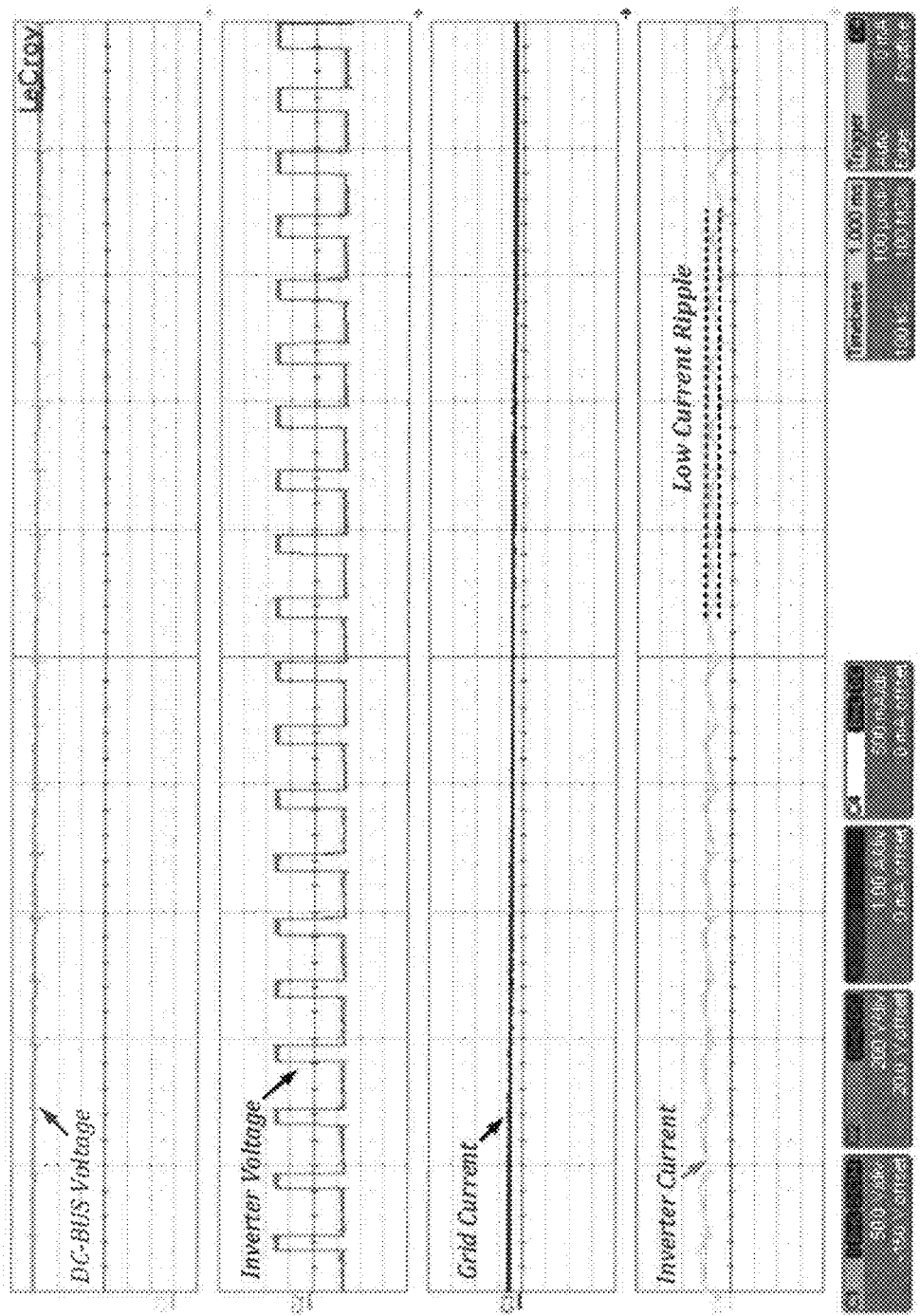
FIG. 17 is a plot of experimental data showing current ripple of a DC-bus voltage optimized adaptive droop controller embodiment.
Figure 18:
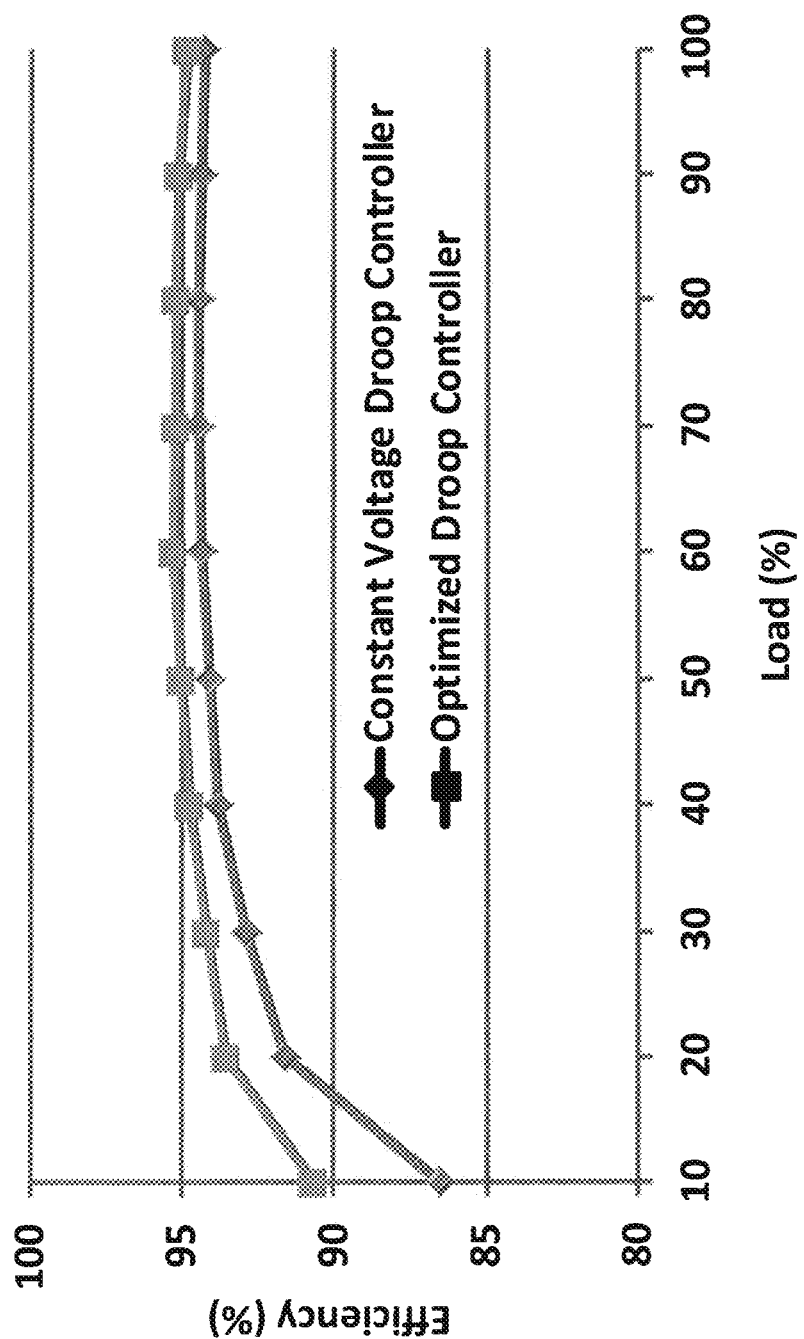
FIG. 18 is a plot showing efficiency curves of a DC-bus voltage optimized adaptive droop controller embodiment and a DC-bus voltage adaptive droop controller embodiment.

FIG. 17 shows the current ripple of the inverter-side inductor. Comparing this figure with FIG. 12B shows that the optimized adaptive droop controller significantly reduces current ripple across the inverter-side inductor. As a result, losses resulting from current ripple are greatly reduced. This is confirmed in FIG. 18 which shows an efficiency curve of the DC-bus voltage optimized adaptive droop controller, and an efficiency curve of the DC-bus voltage adaptive droop controller with constant DC-bus voltage. It is shown that the DC-bus voltage optimized adaptive droop controller increases efficiency by minimizing the power losses in the system, particularly for light loads.

All cited publications are incorporated herein by reference in their entirety.

Equivalents

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

The invention claimed:

1. A DC-bus voltage or current controller for a voltage or current source DC-AC Inverter, comprising:
    a mean value calculator that provides an output signal comprising the mean value of the DC-bus voltage or current of the DC-AC inverter;
    a droop controller that operates in a closed loop of the voltage or current source DC-AC inverter controller with reverse proportional gain;
    wherein the output signal of the mean value calculator is used as an input of the droop controller in the closed loop, such that a ripple in the DC-bus voltage or current is substantially prevented from entering the closed loop.

2. The DC-bus voltage controller of claim 1, wherein the mean value calculator calculates the mean value of the DC-bus voltage from the maximum and minimum of the DC-bus voltage.

3. The DC-bus current controller of claim 1, wherein the mean value calculator calculates the mean value of the DC-bus current from the maximum and minimum of the DC-bus current.

4. The DC-bus voltage or current controller of claim 1, wherein the droop controller is an adaptive droop controller; and
    wherein the adaptive droop controller provides a constant DC-bus voltage or current.

5. The DC-bus voltage or current controller of claim 1, wherein the droop controller is an adaptive droop controller;
    wherein the adaptive droop controller provides a variable DC-bus voltage or current;
    wherein the DC-bus voltage or current is regulated to an optimized value such that power losses for load and grid conditions are minimized or reduced.

6. The DC-bus voltage or current controller of claim 5, wherein power losses across an output filter inductor for varying load and/or grid conditions are minimized or reduced.

7. The DC-bus voltage controller of claim 1, wherein the DC-bus voltage controller is configured for use in a VSI of a power generator in a DG system.

8. The DC-bus voltage controller of claim 7, wherein the DC-bus voltage controller is configured for use in a VSI of a renewable energy power conditioning system.

9. The DC-bus voltage controller of claim 8, wherein the VSI is connected to a power distribution grid.

10. The DC-bus voltage controller of claim 8, wherein the power generator is a photovoltaic cell, wind turbine, or fuel cell.

11. The DC-bus current controller of claim 1, wherein the. DC-bus current controller is configured for use in a CSI of a power generator in a DG system.

12. The DC-bus current controller of claim 11, wherein the DC-bus current controller is configured for use in a CSI of a renewable energy power conditioning system.

13. The DC-bus current controller of claim 12, wherein the CSI is connected to a power distribution grid.

14. The DC-bus current controller of claim 12, wherein the power generator is a photovoltaic cell, wind turbine, or fuel cell.

15. A DC-AC inverter including the DC-bus voltage or current controller of claim 1.

16. A method of controlling DC-bus voltage or current of a voltage or current source DC-AC inverter, comprising:
    using a mean value calculator to output a feedback signal comprising a mean value of the DC-bus voltage or current of the DC-AC inverter;

operating a droop controller in a closed loop of the DC-AC inverter with reverse proportional gain;

using the feedback signal as an input of the droop controller in the closed loop, such that a ripple in the DC-bus voltage or current is substantially prevented from entering the closed loop.

17. The method of claim 16, comprising calculating the mean value of the DC-bus voltage from the maximum and minimum of the DC-bus voltage.

18. The method of claim 16, comprising calculating the mean value of the DC-bus current from the maximum and minimum of the DC-bus current.

19. The method of claim 16, wherein the droop controller is an adaptive droop controller;

the method further comprising using the adaptive droop controller to provide a constant DC-bus voltage or current.

20. The method of claim 16, wherein the droop controller is an adaptive droop controller;

the method farther comprising using the adaptive droop controller to provide a variable DC-bus voltage or current; and regulating the DC-bus voltage or current to an optimized value such that power losses for load and grid conditions are minimized or reduced.

21. The method of claim 20, wherein power losses across an output filter inductor for varying load and/or grid conditions are minimized or reduced.

22. The method of claim 16, configured for use in a VSI of a power generator in a DG system.

23. The method of claim 22, configured for use in a VSI of a renewable energy power conditioning system.

24. The method of claim 23, comprising connecting the VSI to a power distribution grid.

25. The method of claim 23, wherein the power generator is a photovoltaic cell, wind turbine, or fuel cell.

26. The method of claim 16, configured for use in a CSI of a power generator in a DG system.

27. The method of claim 26, configured for use in a CSI of a renewable energy power conditioning system.

28. The method of claim 27, comprising connecting the CSI to a power distribution grid.

29. The method of claim 27, wherein the power generator is a photovoltaic cell, wind turbine, or fuel cell.

* * * * *